(12) United States Patent
Haartsen

(10) Patent No.: US 6,650,630 B1
(45) Date of Patent: Nov. 18, 2003

(54) RESOURCE MANAGEMENT AND TRAFFIC CONTROL IN TIME-DIVISION-DUPLEX COMMUNICATION SYSTEMS

(75) Inventor: Jacobus Cornelis Haartsen, Borne (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/340,268

(22) Filed: Jun. 25, 1999

(51) Int. Cl.[7] .............................. H04J 3/00; H04B 17/00
(52) U.S. Cl. ...................... 370/345; 455/67.1; 370/331; 375/131
(58) Field of Search ................................ 370/337, 280, 370/345, 331; 455/67.1; 375/131

(56) References Cited

U.S. PATENT DOCUMENTS

| | | | |
|---|---|---|---|
| 4,453,247 A | | 6/1984 | Suzuki et al. |
| 4,841,574 A | | 6/1989 | Pham et al. |
| 5,093,923 A | * | 3/1992 | Leslie ........................ 455/67.1 |
| 5,119,375 A | * | 6/1992 | Paneth et al. ................ 370/345 |
| 5,148,429 A | | 9/1992 | Kudo et al. |
| 5,353,341 A | | 10/1994 | Gillis |
| 5,439,775 A | | 8/1995 | Takahashi et al. |
| 5,491,837 A | | 2/1996 | Haartsen |
| 5,528,623 A | | 6/1996 | Foster, Jr. |
| 5,636,243 A | | 6/1997 | Tanaka |
| 5,699,409 A | | 12/1997 | Kojima |
| 5,940,431 A | * | 8/1999 | Haartsen et al. ............. 375/131 |
| 6,016,311 A | * | 1/2000 | Gilbert et al. ............... 370/280 |
| 6,473,412 B1 | * | 10/2002 | Haartsen ..................... 370/331 |

FOREIGN PATENT DOCUMENTS

| | | |
|---|---|---|
| EP | 0329997 | 8/1989 |
| EP | 0399612 | 11/1990 |
| WO | 99/26430 | 5/1999 |

OTHER PUBLICATIONS

Spears, William M., "Simulated Annealing for Hard Satisfiability Problems" in "Cliques, Coloring, and Satifiablity: Second DIMACS Implementation Challenge", David S. Johnson and Michal A. Trick (eds.), DIMACS Series in Discrete Mathematics and Theoretical Computer Science, vol. 26, pp. 533–588, American Mathematical Society (1996).

Haartsen, Jaap, "Bluetooth—The universal radio interface for ad–hoc, wireless connectivity", found in Ericsson Review, Telecommunications Technology Journal No. 3, 1998.

Jayant, NS and Noll., P., "Digital Coding of Waveforms" Prentice Hall, 1984.

* cited by examiner

*Primary Examiner*—William Cumming
(74) *Attorney, Agent, or Firm*—Burns, Doane, Swecker & Mathis, L.L.P.

(57) ABSTRACT

A system and method for resource management and traffic control in time division duplex communication systems is discloses. A multi-radio base station maintains communication links with a plurality of remote terminals, each of which requests a specific bandwidth ratio. A controller analyzes the requested bandwidth ratios and allocates slots in the base station radios according to a packing scheme that synchronizes the transmission and receive timing of the multiple base station radios communication links.

4 Claims, 20 Drawing Sheets

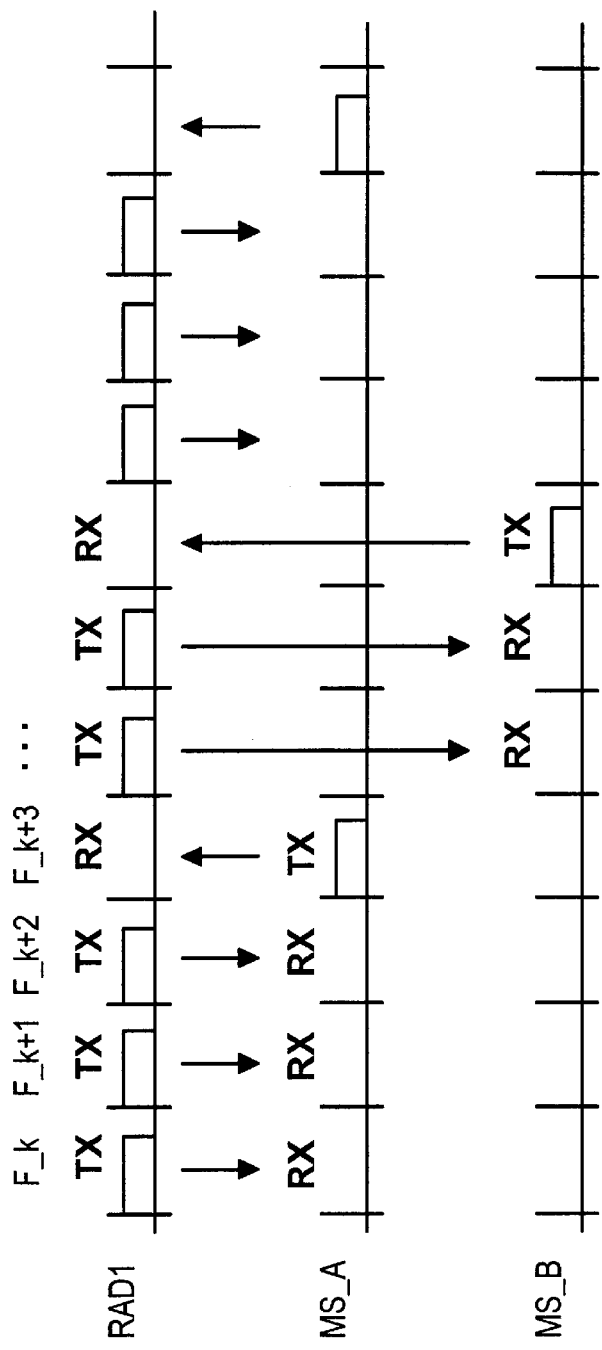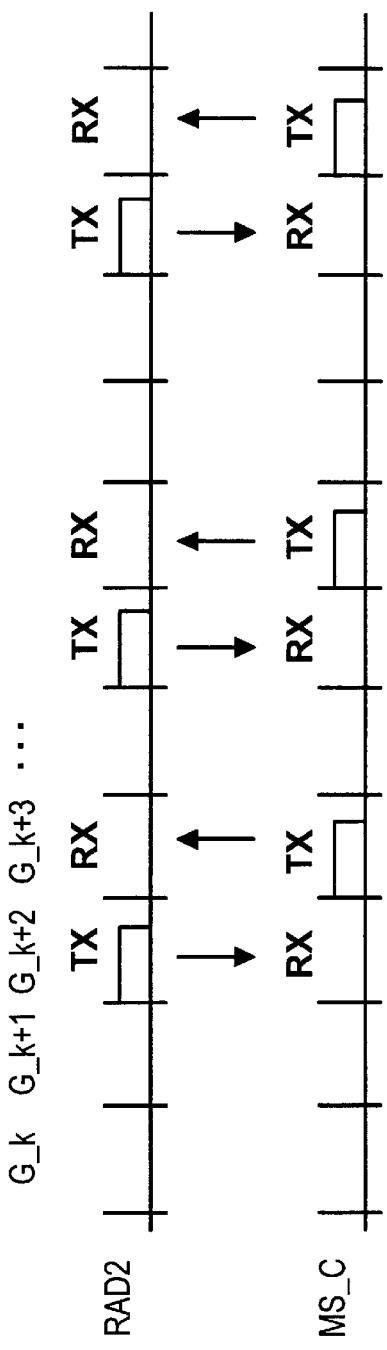
FIG. 8a

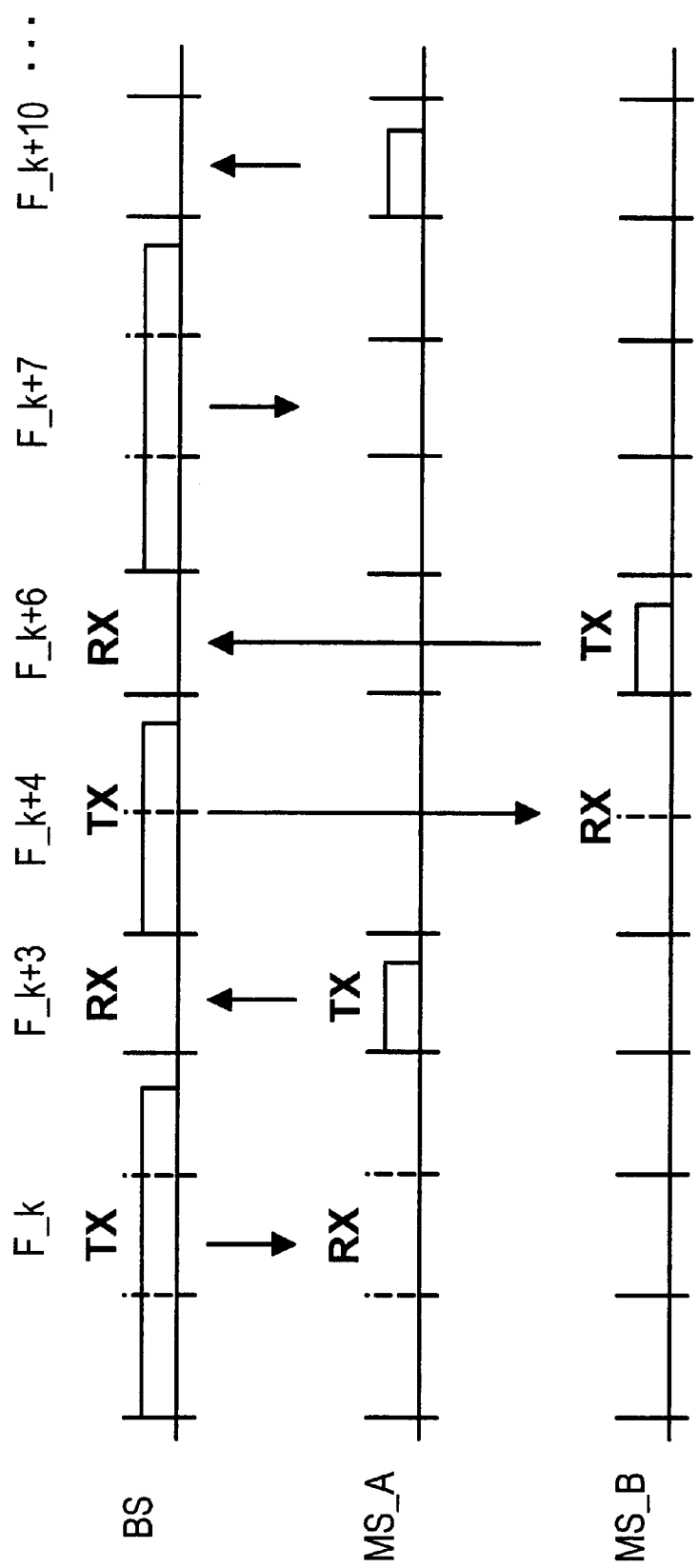

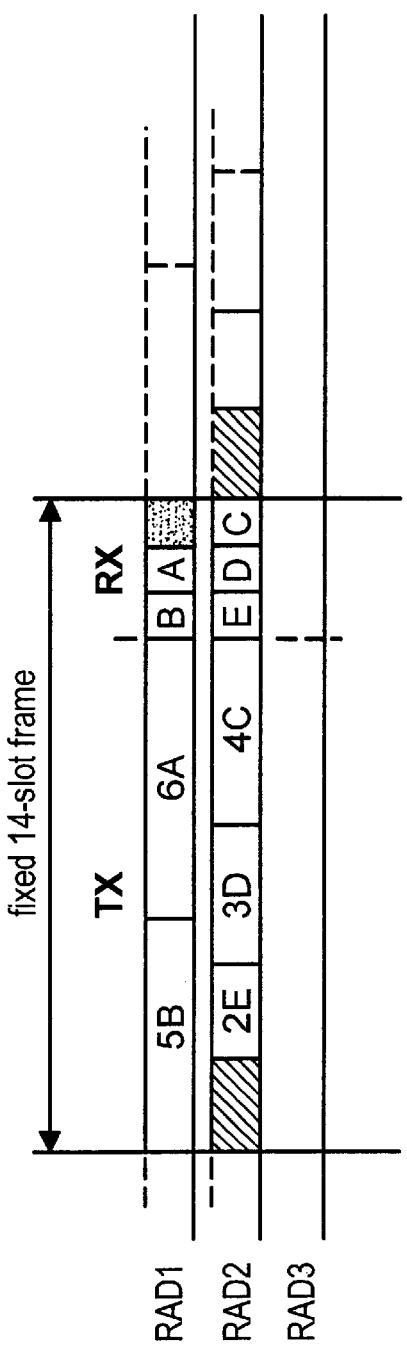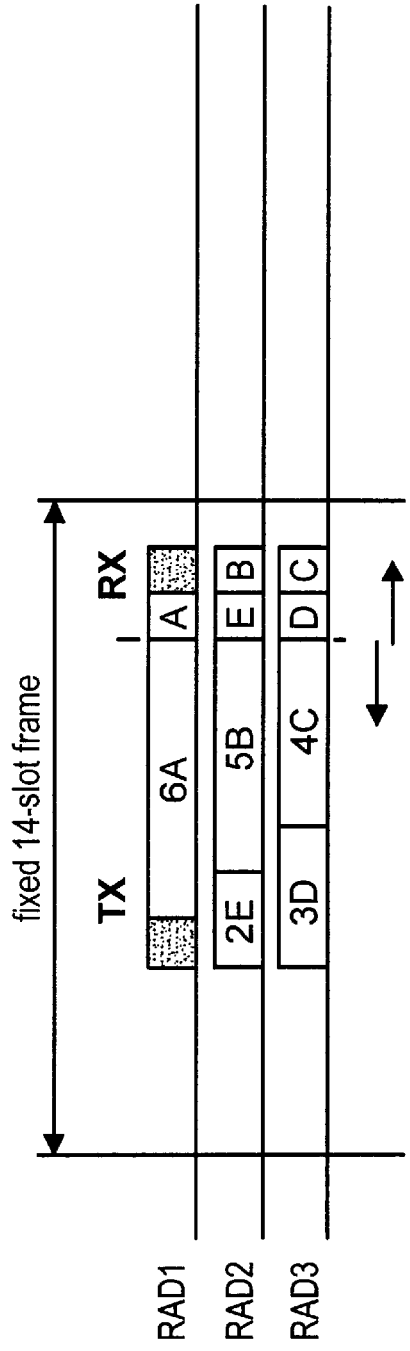

RESOURCE MANAGEMENT AND TRAFFIC CONTROL IN TIME-DIVISION-DUPLEX COMMUNICATION SYSTEMS

BACKGROUND

This invention relates to radio communication and particularly to cellular radio telephone systems that use time division duplex communication.

Applications of mobile and cordless radio telephony are becoming increasingly widespread, and cellular radio telephone systems are well known and have reached a high level of maturity. Cellular systems typically consist of a backbone network of a plurality of radio base stations located at strategic positions. Each base station covers a respective geographic area called a cell, and since adjacent cells partly overlap, a portable device like a mobile telephone can move from one cell to another without losing contact with the backbone network. As a portable device moves during a communication session, the connection is handed off from one radio base station to another according to a process that depends on, among other factors, the location of the portable relative to the base stations.

All over the world, cellular systems continue to be deployed to offer nation-wide public telephony. Current examples of wide-area mobile telephone systems are the Global System for Mobile communications (GSM), the Digital Advanced Mobile Phone System (D-AMPS), the IS-95 (CDMA) system, and the Personal Digital Cellular (PDC) system. These systems are run by operators that offer various public services using portions of the radio spectrum that typically are licensed by national regulatory bodies.

In addition to these licensed-spectrum cellular communication systems, new kinds of cellular system are now entering the market that are deployed in restricted areas like indoor environments (e.g., offices, houses, exhibition halls, etc.) and local areas (e.g., school campuses, office parks, etc.). These new systems are privately owned and typically use unlicensed portions of the radio spectrum like the globally available industrial, scientific, and medical (ISM) bands at 900 MHz, 2400 MHz, and 5700 MHz. Examples of such local-area, unlicensed-spectrum mobile communication systems are the Digital European Cordless Telephone (DECT) system, the Personal Handyphone System (PHS), and wireless local area computer networks (WLANs).

Adroit resource allocation in a cellular system is critically important. To connect a mobile or cordless terminal to the backbone network, both an access point to the network (e.g., a radio base station) must be available and a radio channel must be available to connect the terminal to the access point. Both the access point and the radio channel can be considered allocable system resources. When a connection has to be made, the access point and/or the terminal has to select a radio channel, but radio resources are scarce. The cellular system concept is a way to support a large number of terminals with a limited radio spectrum by organizing the spectrum into channels that can be used simultaneously for different connections, provided the geographical distance between users participating in different connections is large enough that their mutual interference is small relative to their intended received signals.

In most cellular systems, the access point closest to a remote terminal seeking a connection is allocated to that terminal since that access point usually provides the lowest propagation loss to that terminal. The remote terminals regularly scan the spectrum for control or beacon signals broadcast by the access points on predetermined radio channels, and each terminal locks, or synchronizes, itself to the strongest control or beacon channel it receives.

In some mobile systems, a terminal does not by default lock to the strongest access point but chooses an access point based on other criteria, e.g., whether a base station has radio channels available and/or whether the interference on any available radio channels is sufficiently low. Indeed, it is not the channel having the highest carrier power that is important but the channel having the highest carrier-to-interference (C/I) ratio. An exemplary communication system in which base station and channel selection are based on the C/I ration is described in the U.S. Pat. No. 5,491,837 to Haartsen for "Method and System for Channel Allocation Using Power Control and Mobile-Assisted Handover Measurements", which is expressly incorporated here by reference.

In general, a "channel" can be a carrier frequency, a time slot, a code, or a hybrid of these, according to the particular access technique used by the communication system. In a frequency division multiple access (FDMA) system, a radio channel is a radio frequency (RF) carrier signal for transmitting and an RF carrier signal for receiving that are usually allocated for the duration of a communication session. (Separating the transmit and receive carriers, which are usually selected from respective dedicated bands, permits simultaneous transmission and reception and is called Frequency Division Duplex (FDD).) The Advanced Mobile Phone System (AMPS) and the Nordic Mobile Telephone (NMT) system are examples of simple FDMA systems that use carrier frequency modulation. In a time division multiple access (TDMA) system like GSM, each carrier signal is time-shared by up to eight users, i.e., each carrier signal transports successive frames of eight time slots each, and one or more time slots in each frame are allocated to the session. In a direct-sequence code division multiple access (CDMA) system, an information bit stream to be transmitted is effectively superimposed on a much-higher-rate bit stream that may consist of successive repetitions of a unique code sequence, and the superimposed bit streams may then be scrambled by multiplication by another, usually pseudo-noise, bit stream, with the result transmitted as a modulation of an RF carrier signal.

First-generation cellular systems like AMPS and the NMT system are analog, which is to say that an analog (temporally continuous) information signal to be transmitted modulates the frequency of the carrier signal. The primary use of analog systems is voice service, although low-rate digital data transmission is possible by using analog modems. In second-generation systems like GSM and D-AMPS, the information signal to be transmitted is digital (binary bits), which enables the information to be compressed, error-correction coded, organized into packets, and transmitted in bursts or packets. Thus, a carrier signal does not have to be in use all the time for one connection; instead, the carrier can be divided into slots, and different slots can be allocated to different users as in TDMA. In current second-generation TDMA systems, as well as in CDMA systems, the spectrum is still divided into bands of carrier frequencies, so such systems still have FDMA elements. If each carrier is divided into time slots, this results in a hybrid FDMA/TDMA system, and if each user is separated by a respective code, this results in a hybrid FDMA/CDMA system. Hybrid FDMA/TDMA/CDMA systems have also been described.

Another benefit of time-slotted systems is that downlink (base-station-to-remote-terminal) transmission and uplink (remote-terminal-to-base-station) transmission do not have to occur simultaneously, which is to say that FDD is not necessary. Instead, downlink and uplink transmissions can happen in different time slots on the same carrier, which may be called time division duplex (TDD). Full duplex operation is obtained by alternating between transmission and reception. Communication systems like cellular systems that are used for wide-area services still use FDD, which is preferable when access points are placed at elevated positions because FDD helps prevent interference between access points. Indoor communication systems and other high-data-rate systems preferably use TDD, in which the spectrum is not split into dedicated downlink and uplink bands. This enables the cost of the radio transceivers to be reduced because the transmission and reception processes occur sequentially with the same hardware, avoiding the costly duplexer that is otherwise required to provide sufficient isolation between the transmitter and receiver hardware. Moreover, downlink and uplink channels can be selected from an entire spectral band.

In conventional TDD systems like the DECT system, downlink and uplink channels use the same carrier frequency. More advanced TDD systems like the "BLUETOOTH" system use a frequency hopping concept: downlink transmission and uplink transmission occur in different time slots, but the carrier frequency for each slot can be different and can be any carrier in a particular radio band, irrespective of whether the slot is a downlink slot or an uplink slot. Information about the BLUETOOTH system is widely available.

For symmetric services like voice communication, the bandwidths required in the downlink and uplink are substantially identical (both parties spend more or less equal time talking), and thus a division of the radio band into a downlink part and an uplink part which are of substantially equal size is reasonable. Data services, however, are typically asymmetric, which is to say that the bandwidths required in the downlink and uplink are substantially unequal (one party spends more time downloading than the other), and thus equal-sized downlink and uplink parts are less attractive. Some services, like Internet service, require much more downlink bandwidth, or capacity, than uplink bandwidth or the other way around. In the former case, the downlink band should preferably be larger.

In an FDD system, the downlink and uplink bands are usually fixed and cannot be changed, i.e., there is a strict separation between the downlink and uplink frequencies. A TDD system can allocate downlink and uplink channels much more flexibly since the downlink and uplink are not strictly separated; indeed, the entire band can be allocated temporarily for downlink or uplink services exclusively. In a TDD system as noted above, the channel is divided into a succession of time slots, and during each slot, one or more packets or bursts are transmitted. For a symmetric link, the distribution of slots between downlink and uplink transmission is substantially identical, and for an asymmetric link, the downlink, for example, can be allocated more slots than the uplink. This allocation can be carried out dynamically, i.e., as the traffic demand changes, the bandwidth distribution between downlink and uplink can be changed by changing the slot allocation.

Nevertheless, even the flexibility of TDD slot allocation has restrictions. A TDD radio transceiver can either transmit or receive, but not simultaneously. For a base station having a single transceiver, this is not a disadvantage but rather an advantage since expensive duplexers can be avoided, but this poses a problem if the base station has to be equipped with additional transceivers to increase capacity. Although duplexers are not an issue when transmission and reception happen in different radios, simultaneous transmission and reception is impossible if the transmit and receive frequencies are in the same band and the transmitter and receiver are physically close, as is the case when multiple radios have to be merged into a single base station, because when a transmitter transmits, its relatively high-level signal will saturate the front ends of the co-located receivers. The difference in level between a signal received from a co-located transmitter and a signal received from a remote terminal can be 70 dB or greater, which is so large that a base station receiver has no possibility of successfully filtering the desired signal from the remote terminal from the interfering signal from the co-located transmitter.

The only previously known way that a plurality of TDD transceivers can be integrated into the same base station is to synchronize their downlink and uplink transmissions such that either all transceivers transmit or all transceivers receive at the same time. This prevents the receivers from blinding by one or more of the transmitters, and is not much of a problem for a system providing symmetric services. Synchronized downlink and uplink transmissions simply means that slots must be allocated such that there is alignment between the downlink slots of different radios and alignment between the uplink slots of different radios. Asymmetric services, however, are severely hampered by a downlink/uplink synchronization requirement as it requires that the asymmetry (i.e., the imbalance between downlink and uplink bandwidths) is identical in all radios.

It is therefore an object of this invention to solve these problems in prior TDD communication systems and to provide methods and devices that support asymmetric services in a TDD system having multi-radio units and that use smart resource allocation and smart control of asymmetric traffic.

SUMMARY

In a TDD communication system according to Applicant's invention, base station selection and channel selection are based on the asymmetry of the desired service and on received signal strength and channel availability. In a multi-radio base station, the downlink/uplink slots are preferably allocated such that all radios simultaneously transmit or receive. The slots are selectively "packed" together so as to obtain optimal throughput either for an individual user or for all users as a group. In a system having a plurality of base stations covering the same area, base stations are selected such that terminals having substantially the same downlink/uplink asymmetry preferably connect to the same base station.

In one aspect, the invention provides, in a communication system that implements communication links between a multi-radio base station and a plurality of remote terminals, wherein each remote terminal requests a particular bandwidth ratio, a method of allocating slots in the communication links comprising the steps of: (a) sequentially assigning, in descending order based upon the respective remote terminal's required bandwidth ratio, remote terminals to an available base station radio, and (b) after the available base station radios have been assigned a first remote terminal, assigning the remaining remote terminals, in descending order based upon the respective remote terminal's required bandwidth ratio, to the base station radios in the reverse sequence implemented in step (a).

In another aspect, the invention provides, in a communication system that implements communication links between a multi-radio base station and a plurality of remote terminals, wherein each remote terminal requests a particular bandwidth ratio, a method of allocating slots in the communication links comprising the steps of: (a) determining the minimum number of base station radios required to support the remote terminals' transmission requirements, and (b) sequentially assigning, in descending order based upon the respective remote terminal's required bandwidth ratio, remote terminals to an available base station radio selected from the minimum number of base station radios calculated in step (a), and (c) after the available base station radios have been assigned a first remote terminal, assigning the remaining remote terminals, in descending order based upon the respective remote terminal's required bandwidth ratio, to the base station radios in the reverse sequence implemented in step (b).

In yet another aspect, the invention provides a communication system. The system comprises a base station having a plurality of radio transceivers for establishing communication links with remote terminals, a plurality of remote terminals, and a controller for allocating the radio transceivers among the plurality of remote terminals in range of the base station, wherein the controller allocates slots in the base station radios according to a packing scheme that synchronizes the transmission and receive timing of the multiple base station radios communication links.

BRIEF DESCRIPTION OF THE DRAWINGS

The objects and advantages of Applicant's invention will be understood by reading this description in conjunction with the drawings, in which:

FIGS. 8A, 8B depict examples of a multi-radio base station supporting three users having link bandwidth ratios of 3:1, 2:1, and 1:1, respectively;

FIGS. 9A, 9B depict examples of a base station supporting two users having link bandwidth ratios of 3:1 and 2:1 with multi-slot packets;

FIGS. 12A, 12B depict examples of slot allocation methods for a frame length of fourteen slots;

DETAILED DESCRIPTION

A TDD communication system in accordance with Applicant's invention is very flexible when it comes to providing data services because bandwidth can be allocated and re-allocated dynamically among system users by assigning and re-assigning time slots on the carrier signals to the users according to the users' needs.

Figure 1:
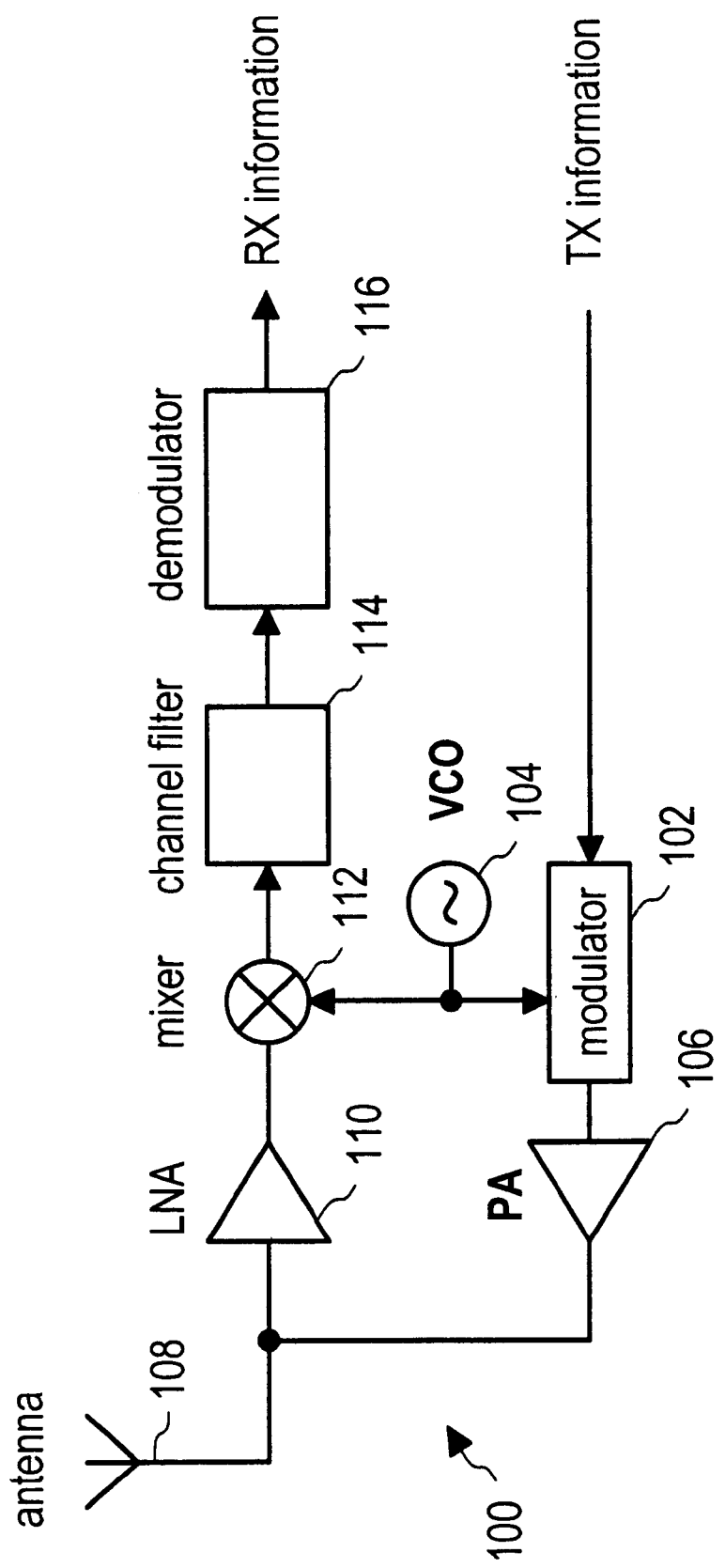
FIG. 1 is a block diagram of a TDD transceiver.

An example of a hardware architecture for a TDD radio 100 is shown in FIG. 1. Since the transmission and reception operations occur at different moments, the same circuitry can be used for both operations and a simple radio results. Indeed, the radio can be implemented as a single integrated circuit, or chip.

As seen in the simplified representation of FIG. 1, information to be transmitted (TX information) by the radio 100 passes to a modulator 102, which modulates a higher-frequency carrier signal provided by a voltage-controlled oscillator (VCO) 104 with the TX information according to the format and access technique employed by the system. The magnitude of the modulated carrier produced by the modulator 102 is then typically increased by a power amplifier (PA) 106, which provides its output signal to a suitable antenna 108 for transmission. It will be appreciated that the TX information would generally be encoded according to an error-correcting code and, perhaps, a security code. Forward error correction and scrambling codes are well known in the art of cellular radio telephony, so they need not be described in more detail here. When it is not transmitting, the antenna 108 receives portions of modulated carrier signals transmitted by other system users and provides those portions to a low-noise amplifier (LNA) 110, which increases the magnitude of the received portions without adding substantial noise and provides the increased modulated carrier signals to a mixer 112. The received carrier signal is stripped away by the mixer 112 in a process called heterodyning based on a local oscillator signal provided by the VCO 104, and the resulting signal is provided to a channel filter 114 and a demodulator 116 that cooperate to produce information that is received (RX information). In essence, the RX information is a replica of TX information that modulated a carrier signal transmitted by another user. If the TX information was encoded and/or scrambled, the RX information is correspondingly decoded and/or descrambled before being passed to a user or further processing devices. The frequency of the signal produced by the VCO 104 is set precisely based on control signals provided by a controller (not shown).

Figure 2:
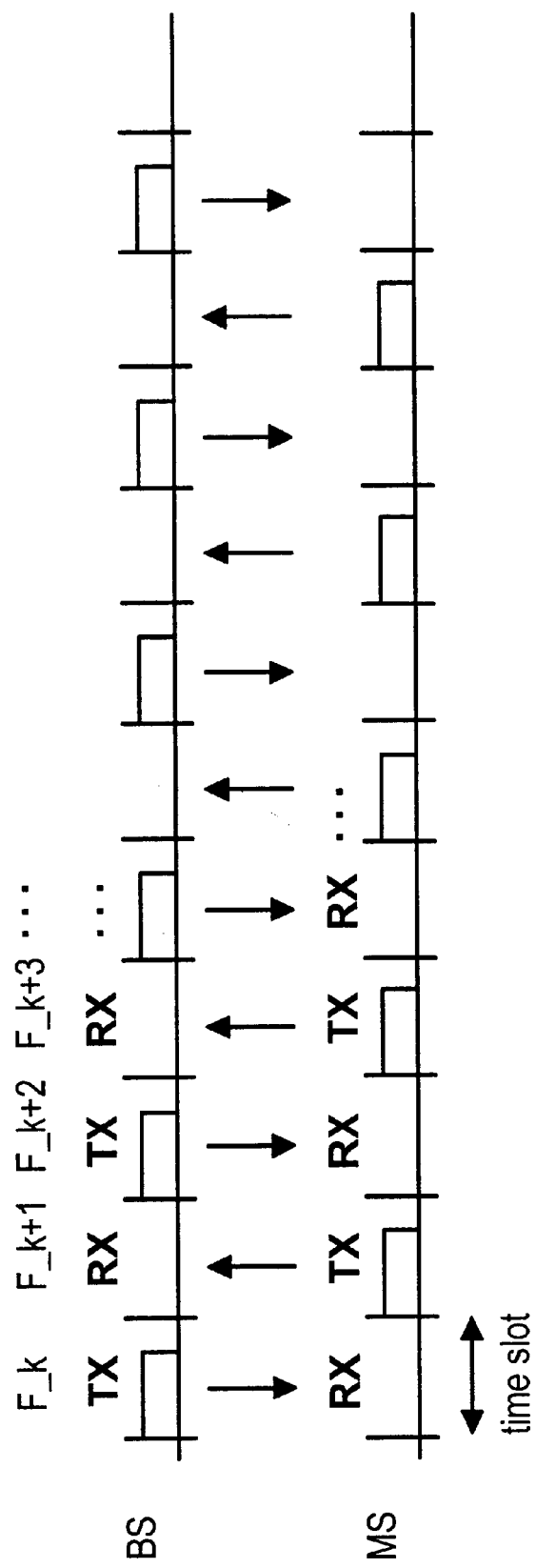
FIG. 2 illustrates a TDD channel having a downlink and an uplink that have substantially the same bandwidths.

As described above, radio systems using digital modulation commonly have carrier signals divided into successive time slots. FIG. 2 depicts the slot structure of a TDD system having a base station BS and a mobile station MS that alternately transmit and receive. A packet or burst containing a sequence of information bits can be sent in each time slot. The successive time slots can be identified by a running index k, and carrier frequencies used in the slots can be identified by for example $F\_k$, $G\_k$, etc., where F and G indicate different hop sequences. Some communication systems employ packets that carry 30–300 bytes of information. In principle in a TDD system, a decision can be made for each slot whether to use that slot for transmission or for reception. In addition, the carrier frequency used for each slot can be any valid frequency present in the spectrum occupied by the communication system. For many conventional TDD systems, the carrier frequency $F\_k$ used in one slot is the same as the carrier frequency $F\_{k+1}$ used in the next slot, which is to say that all transmissions and receptions between a BS and an MS use the same carrier frequency. For more advanced systems, the carrier frequency F_k used in a slot is not the same as the carrier frequency F_k+1 used in the next slot, which is to say that a different carrier frequency can be selected for each slot. In these more advanced systems, the radios at the sender and the receiver hop in synchrony according to an agreed hopping sequence, which is usually pseudo-random.

Figure 3:
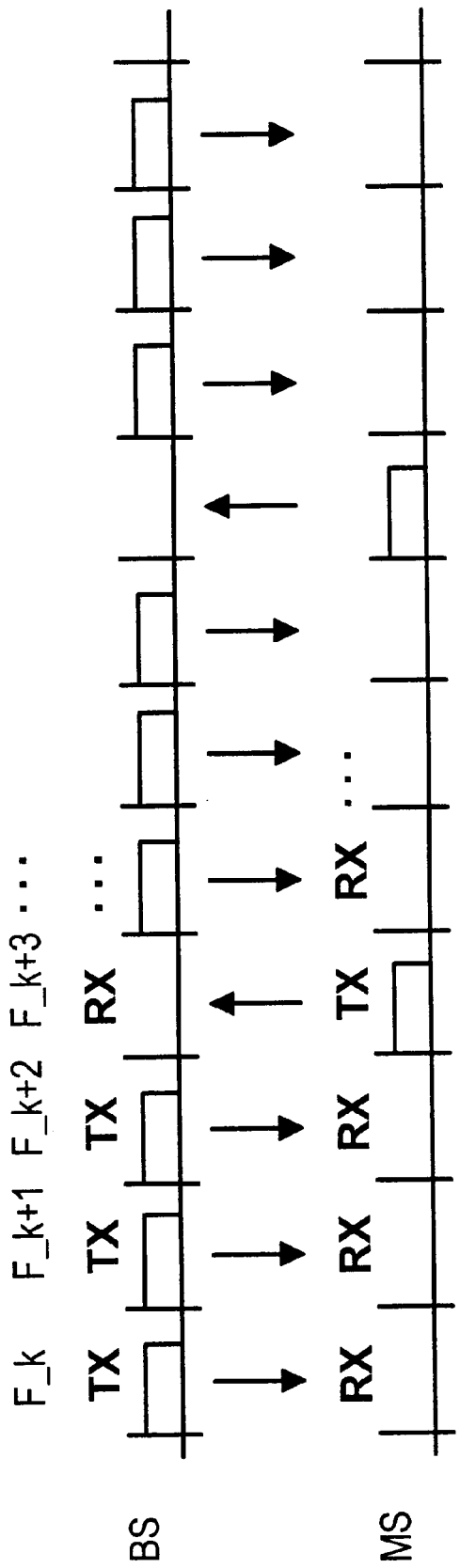
FIG. 3 illustrates a TDD channel having a 3:1 ratio between the bandwidths of the downlink and the uplink.

When the radios alternately transmit and receive as illustrated in FIG. 2, the bandwidth in the uplink is identical to the bandwidth in the downlink, provided the same type of packets (e.g., same error correction coding, etc.) are used in both links. This results in symmetric or balanced links. In accordance with Applicant's invention, it is possible to change the balance and increase the bandwidth in one direction at the expense of the bandwidth in the other direction in a TDD system. This is illustrated by FIG. 3, which depicts a slot structure having a downlink (from BS to MS) bandwidth that is three times as much as the bandwidth of the uplink, i.e., there is a 3:1 ratio between the link bandwidths. In essence, three times as many slots are devoted to the downlink (e.g., the slots using carrier frequencies F_k, F_k+1, F_k+2) as are devoted to the uplink (e.g., the slot using carrier frequency F_k+3).

Figure 4:
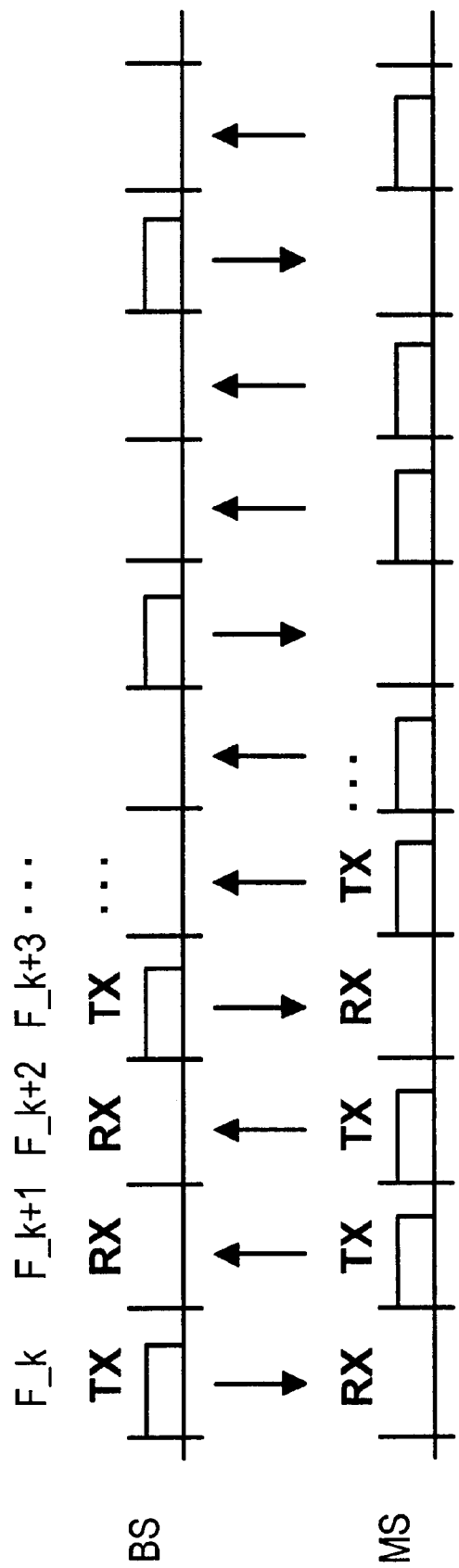
FIG. 4 illustrates a TDD channel having a 1:2 ratio between the bandwidths of the downlink and the uplink.

The downlink and uplink bandwidths are preferably determined, of course, by the respective service requirements of the downlink and uplink. For a voice service, symmetric, or balanced, links having bandwidth ratios of 1:1 are usually desired since both speakers should have the same bandwidth since each can be expected to speak half the time. Data applications, however, naturally tend to unbalanced links; a service for a client-server application, for example, usually requires more bandwidth in the server-to-client direction since the information flow in the other direction is usually merely low-rate control information. A TDD communication system can quickly implement an unbalanced service, and the bandwidth allocation can be carried out dynamically since the same service may require different bandwidth allocations at different moments. For example, a downlink and uplink may have the 3:1 bandwidth ratio as illustrated in FIG. 3 at one moment, but at another moment they may have a 1:2 ratio, which is illustrated in FIG. 4. Dynamic bandwidth allocation is a great strength of a TDD system in accordance with Applicant's invention. It will be appreciated that the TDD system can also support symmetric services by (dynamically) allocating bandwidth such that the same number of slots is assigned to a downlink and to an uplink (a bandwidth ratio of 1:1, as seen, for example, in FIG. 2).

Figure 5:
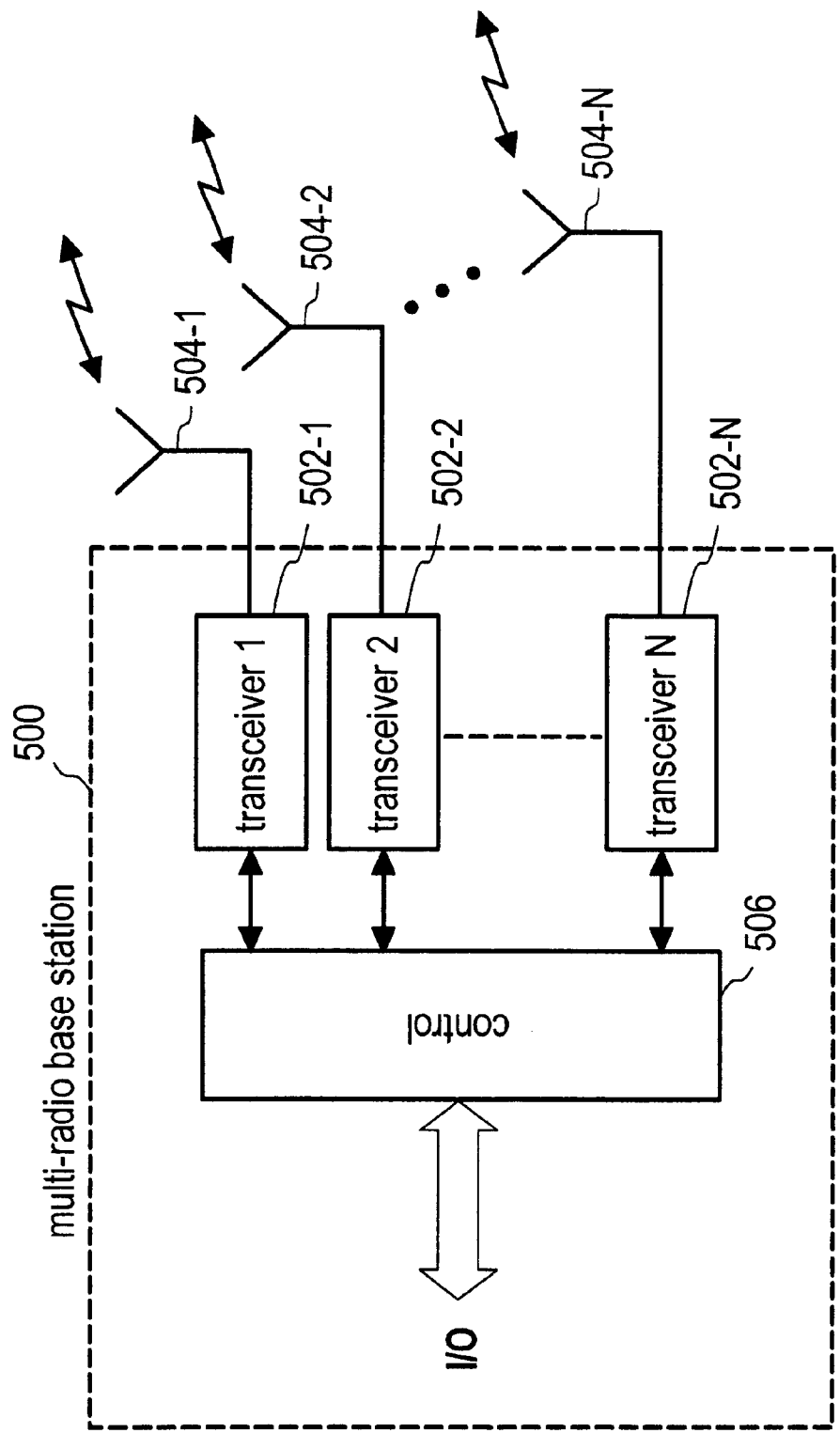
FIG. 5 is a block diagram of a multi-radio base station for a TDD communication system.

Such varied bandwidth allocations can be realized simultaneously for a plurality of different connections by a multi-radio station 500 that is illustrated in FIG. 5. It will be understood that Applicant's multi-radio configuration is not restricted to base stations but can be used in remote terminals as well. In FIG. 5, the multi-radio station 500 comprises a plurality N of separate radios 502-1, 502-2, . . . 502-N that are shown co-located in the same device. Each of the N separate radios may be configured like the radio 100 depicted in FIG. 1, but it is expected that many components may be shared among some or all of the N radios 502. As just one example, a single antenna can be used for all N radios in a multi-radio station, although FIG. 5 depicts separate antennas 504-1, 504-2, . . . 504-N for each of the N radios 502. As another example, a power amplifier for boosting the level of signals for transmission can be shared among several or all of the N radios.

Figure 13:
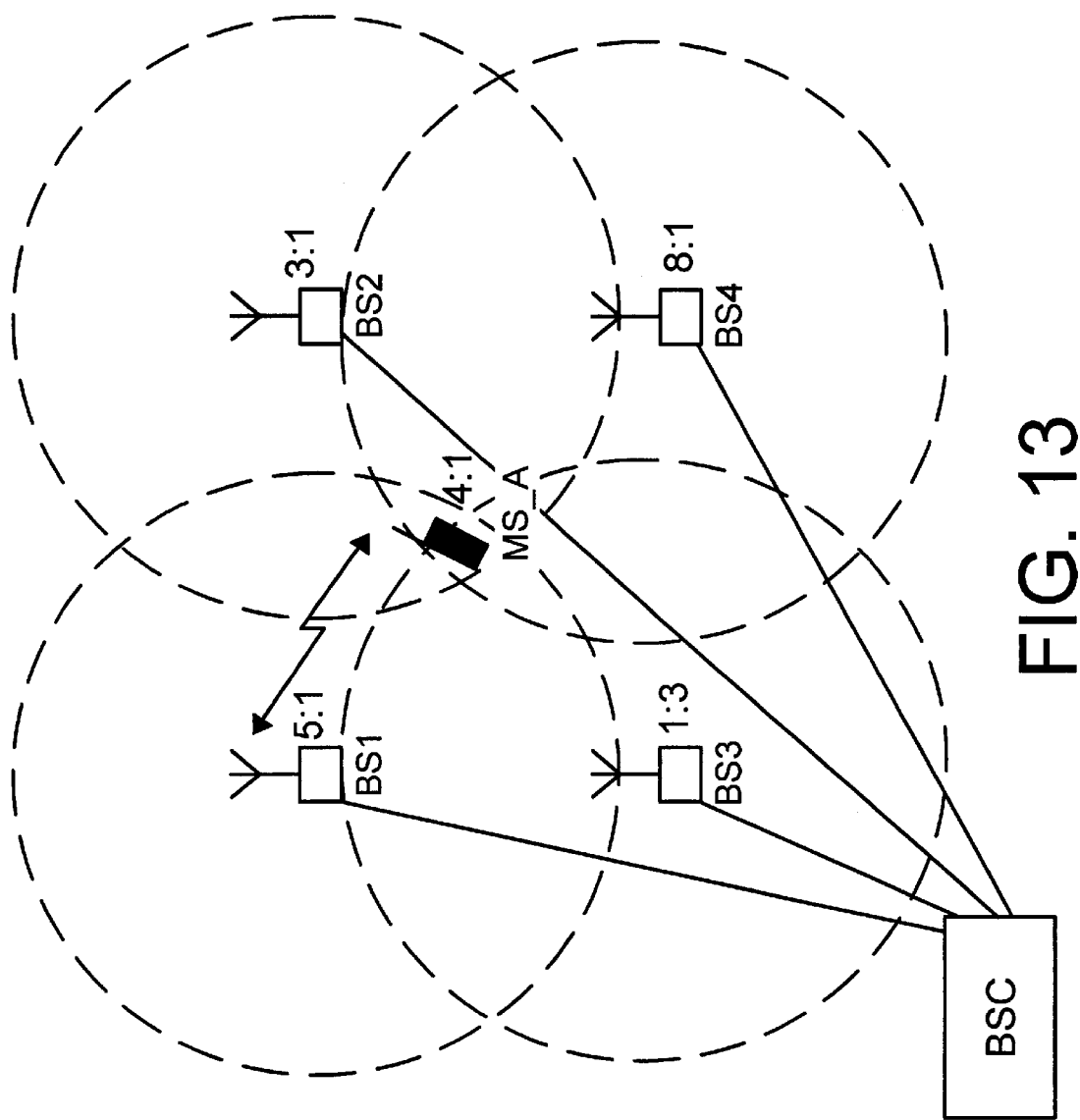
FIG. 13 illustrates a communication system that uses a method of macroscopic resource allocation according to Applicant's invention.

The radios 502 are responsive to control signals produced by a controller 506 that is depicted as an input/output (I/O) interface between the radios and the other parts of the communication system, such as a base station controller that is described in more detail in connection with FIG. 13. As described in more detail below, the controller 506 allocates the radios 502 among the in-range remote terminals based on the downlink/uplink bandwidth ratios desired by the remote terminals. Looked at in an equivalent way, the controller 506 packs the bandwidth ratios desired by the in-range terminals into the total bandwidth available from the radios 502. Accordingly, the radios 502 provide information signals to the controller 506 that are appropriate for the controller to solve a generally well known type of packing problem. It will be appreciated, of course, that dynamical allocations and assignments can be made by the controller in response to dynamical service requirements, with a remote terminal's initial service requirement being determined by an initial negotiation between the terminal and the base station and a change in the terminal's service requirement being subject to another negotiation. It will be understood that the controller 506 may be a programmable processor or other logic circuit that is suitably configured for carrying out the allocation methods described below. Indeed, it is possible for the controller to incorporate a look-up table of predetermined allocations for predetermined groups of users and service requirements.

Figure 6A:
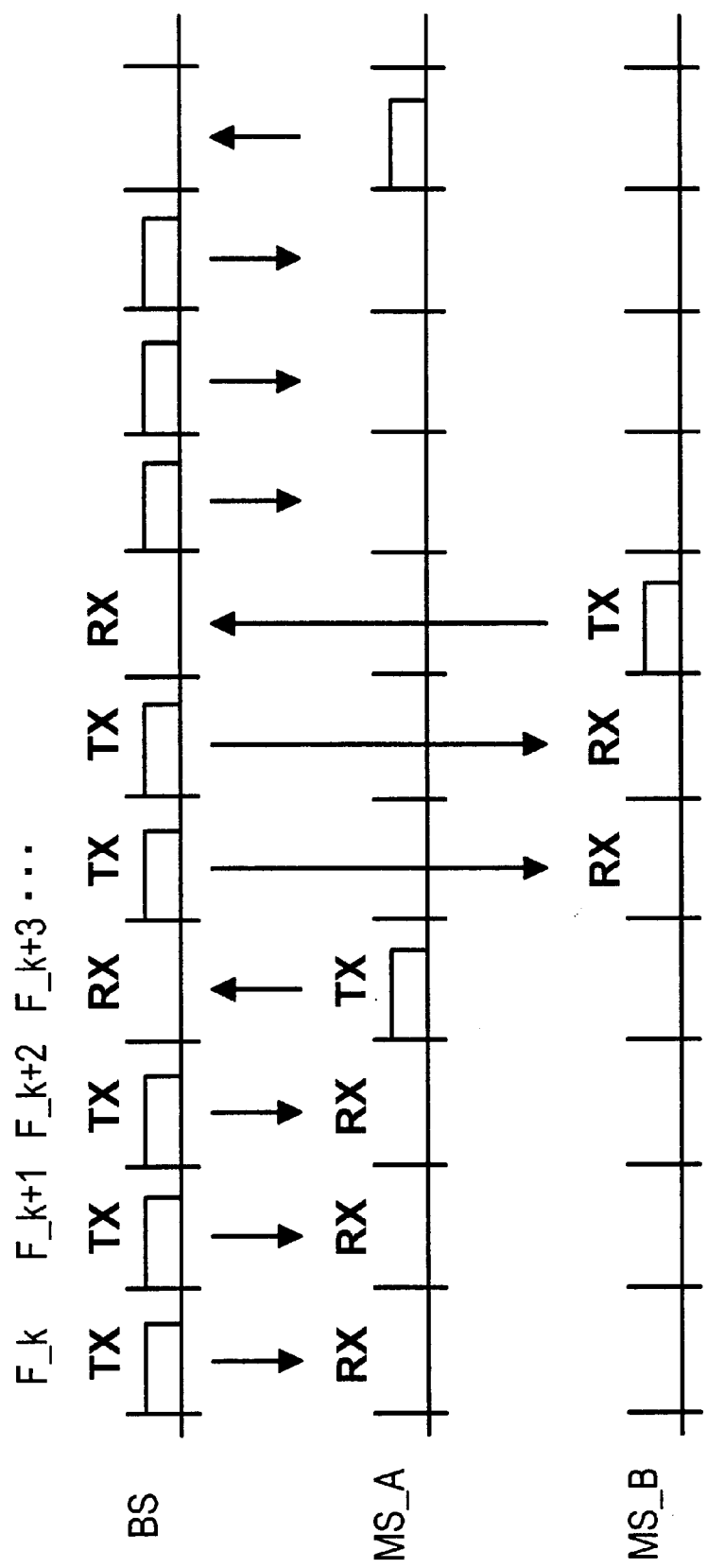
FIGS. 6A, 6B depict examples of a base station supporting two users having link bandwidth ratios of 3:1 and 2:1, respectively.
Figure 6B:
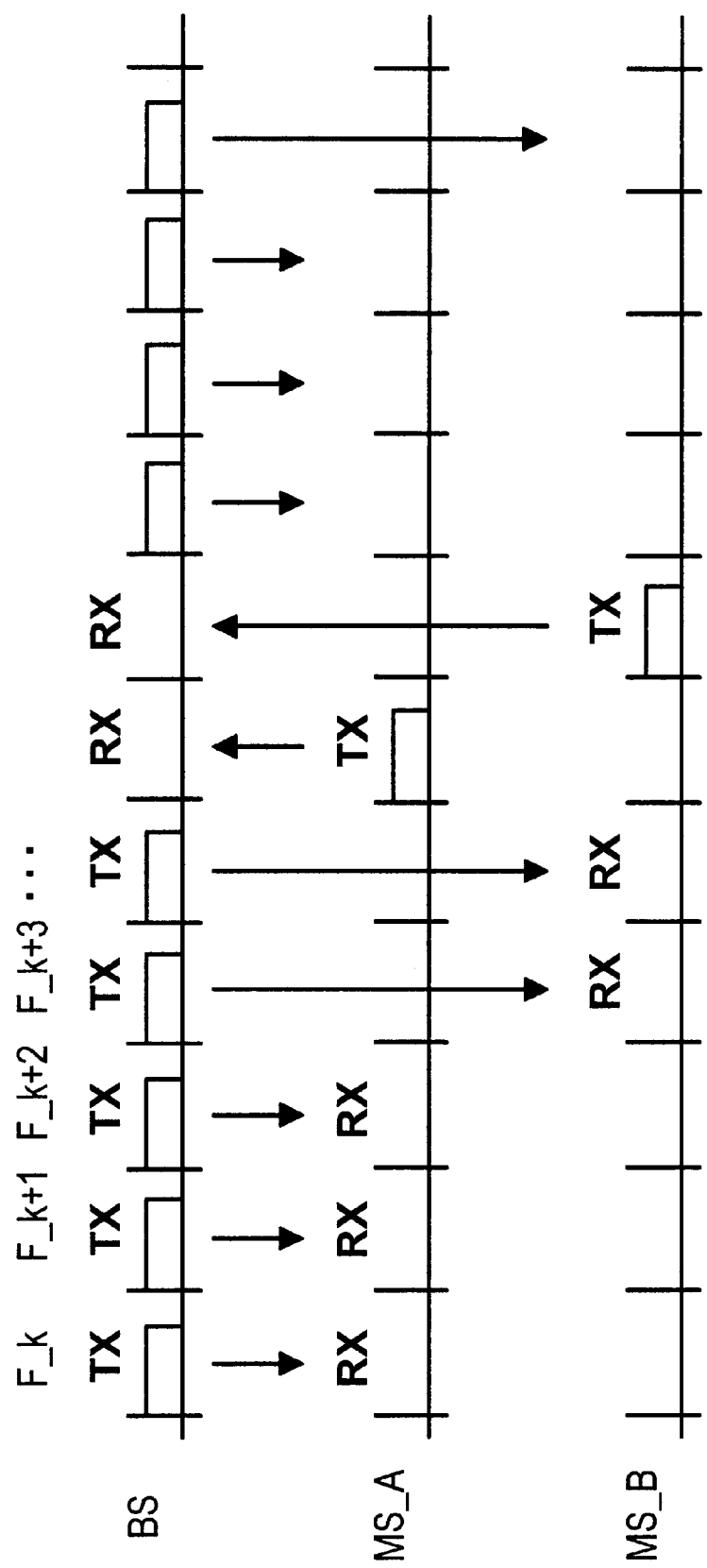

Using TDMA, a single-radio base station can support several users by allocating different time slots to different users. Demonstrative slot structures for this kind of operation for a communication system comprising a base station BS and two remote terminal MS_A, MS_B are depicted in FIGS. 6A, 6B. The system has allocated different slots to the mobile stations MS_A, MS_B as indicated by the different lengths of the vertical arrows, and the downlink/uplink bandwidth ratios are 3:1 for MS_A and 2:1 for MS_B in both figures. It will be appreciated that it is generally not necessary for the slot(s) of any particular uplink to appear immediately after (or before) the slot(s) of the corresponding downlink. FIG. 6A shows the case in which the BS and MS_A exchange a bidirectional set of slots and then the BS and MS_B exchange a bidirectional set of slots and so forth, i.e., the link ratios alternate between 3:1 and 2:1. In FIG. 6B, both downlinks occur in succession and then both uplinks occur in succession and so forth, for what might be considered a kind of combined bandwidth ratio of 5:2, evaluating the bandwidth ratio as the number of consecutive downlink slots divided by the immediately succeeding number of consecutive uplink slots. It will be recognized that FIG. 6A and FIG. 6B show the same throughput performance for both MS_A and MS_B.

Figure 7A:
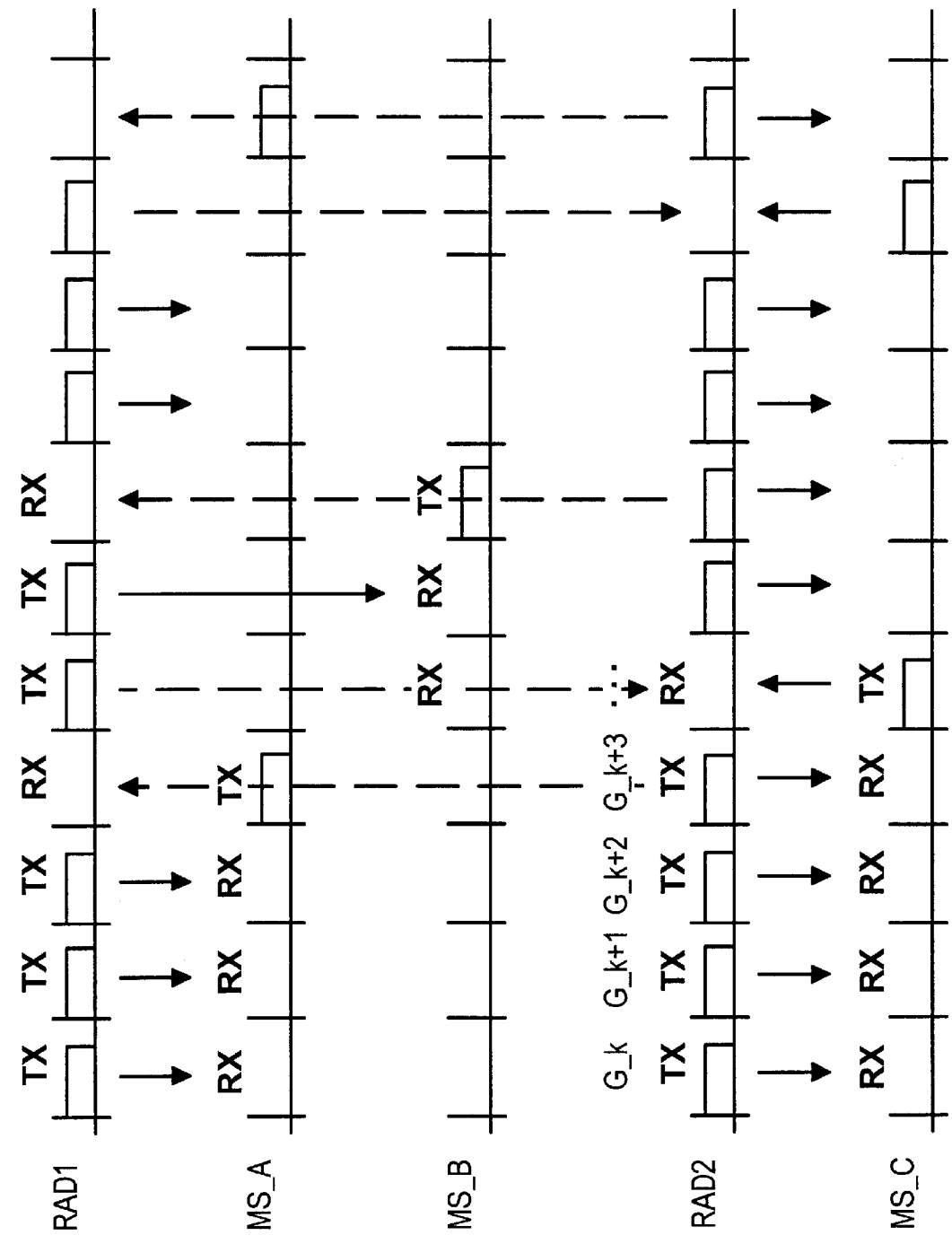
FIGS. 7A, 7B depict examples of a multi-radio base station supporting three users having link bandwidth ratios of 3:1, 2:1, and 4:1, respectively.

Although a base station can employ a single radio like that depicted in FIG. 1 for multiple users as described in connection with FIGS. 6A, 6B, the bandwidth of a single radio can be quickly exhausted, particularly when high-rate data services are required. Bandwidth can be increased by adding another radio to the same base station and by assigning different users to different ones of the radios. This can be seen from FIGS. 7A, 7B, which show slot structures for an enhancement of FIGS. 6A, 6B where the base station comprises two radios RAD1, RAD2 and a third remote terminal MS_C has been added. In FIG. 7A, radio RAD1 is fully occupied by links having the same structure as FIG. 6A, and in FIG. 7B, radio RAD1 is fully occupied by links having the same structure as FIG. 6B, so the second radio RAD2 is needed for the third terminal MS_C. In accordance with Applicant's invention, the service requirements of the remote terminals are packed into the radios.

To help understand some of the constraints on this kind of packing problem, consider an example in which the terminal MS_C requires a service having a bandwidth ratio of 4:1 while services to terminals MS_A and MS_C are as in FIG. 6A. If the traffic on the radios RAD1 and RAD2 must now be organized such that both radios transmit and receive at the same time, then it can be seen that this is not the situation in FIG. 7A, which shows the time slots of RAD1 and RAD2 aligned. Since the frequency hopping sequences used by the two radios are not necessarily the same, i.e., F_k≠G_k, it is at least possible that the radios will not interfere with each other because they do not both transmit the same carrier frequency simultaneously.

Nevertheless, RAD1 and RAD2 interfere with each other in the slots indicated by the heavy dashed arrows in that one is transmitting while the other is receiving. For example, the left-most heavy arrow in FIG. 7A is shown in slots when the radio RAD1 is receiving and the radio RAD2 is transmitting. During these slots, neither RAD1 nor RAD2 can receive data from any of MS_A, MS_B, and MS_C because the power level of signals transmitted by a base station is typically in the milliwatt range for short-range systems and may be as high as several kilowatts for long-range systems while the signals received by the base station from the remote terminals can range from nanowatts to picowatts. Thus, if a base station transmitter transmits at the same time as the remote terminal(s), the base station receiver is swamped by signal leakage from its nearby transmitter that is many orders of magnitude larger than the signals coming from the mobile terminals, even when F_k≠G_k provided the base station radios use the same spectral band.

To avoid blinding the base station receiver to remote terminal signals, the transmission and reception of RAD1 and RAD2 must be synchronized, but the timing of RAD2 cannot be changed such that the necessary services are provided and this interference situation never happens. Applicant's invention solves this problem.

Figure 7B:
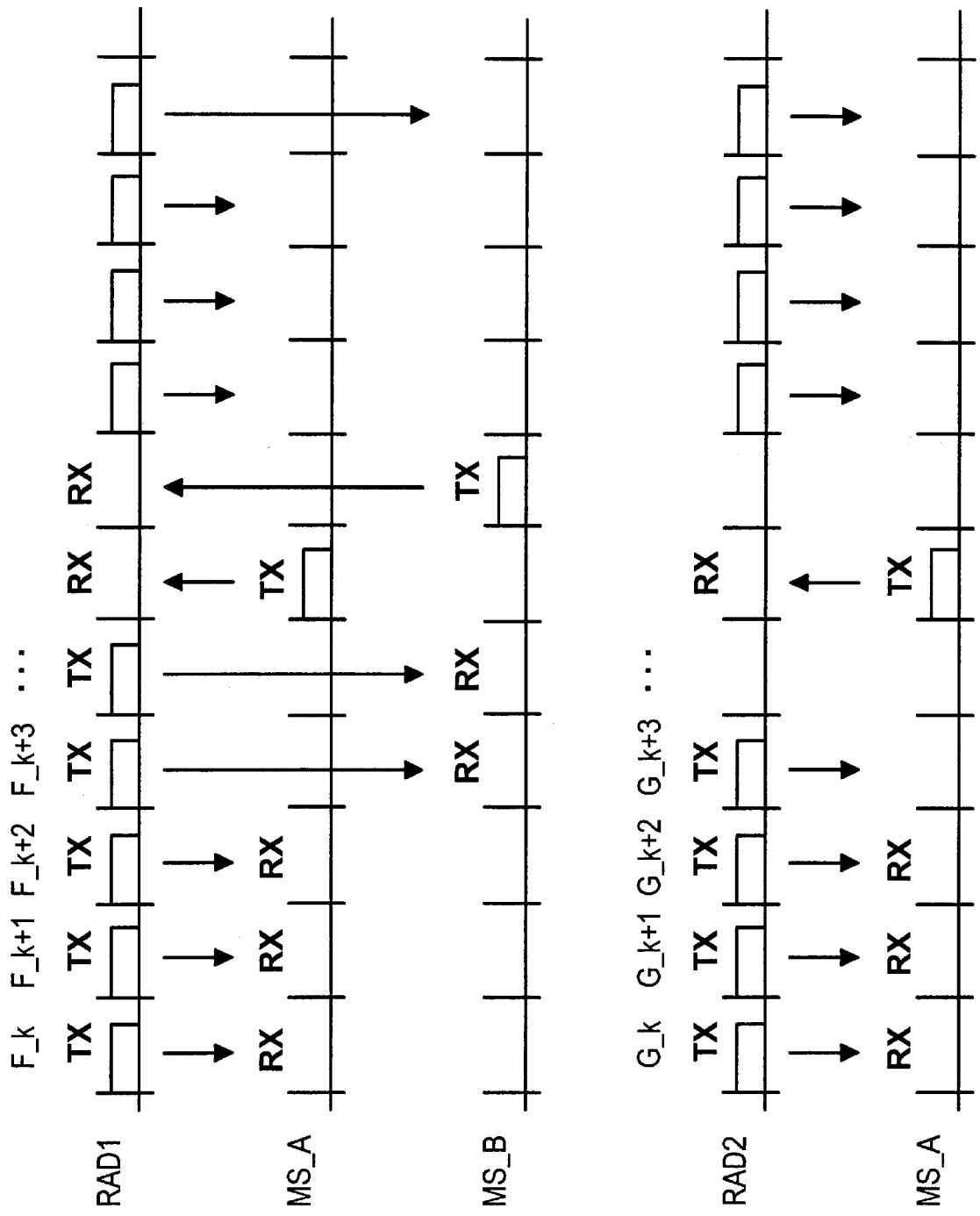

In a first embodiment, transmission and reception are selectively scheduled such that all remote terminals (three in the preceding examples) can be served without encountering the problems described above. To illustrate clearly, consider the service and slot configurations depicted in FIG. 6B, and let RAD1 operate accordingly as illustrated in FIG. 7B. It can be seen from FIG. 7B that MS_C's 4:1 bandwidth ratio service can now be provided by RAD2 without interfering with RAD1, provided that two extra unused slots are added to RAD2's slots structure. As described above in connection with FIG. 6B, the slot structure of RAD1 has an overall 5:2 bandwidth ratio and the extra slots for RAD2 fill out or pad RAD2's slot structure from the 4:1 bandwidth ratio required by MS_C to the 5:2 ratio. Thus, transmission and reception of the different radios in a multi-radio base station are scheduled such that the overall bandwidth ratios of the different radios are the same and that transmission and reception by the different radios occurs in the same slots.

It should be noted that the price paid for this scheduling is reduced throughput to MS_C, i.e., the link between RAD2 and MS_C is idle part of the time. In the example illustrated in FIG. 7B, only 5/7 of the maximal throughput is used to provide the 4:1 bandwidth ratio service requested by MS_C. (The maximal link throughput is obtained when all slots are occupied.) Since the throughput to a user such as MS_C can be less than a link's maximum when radios have scheduled transmission and reception in accordance with the invention, it is preferable to take a user's minimum acceptable throughput into account, along with the user's desired bandwidth ratio, when assigning the user to a radio.

Figure 8B:
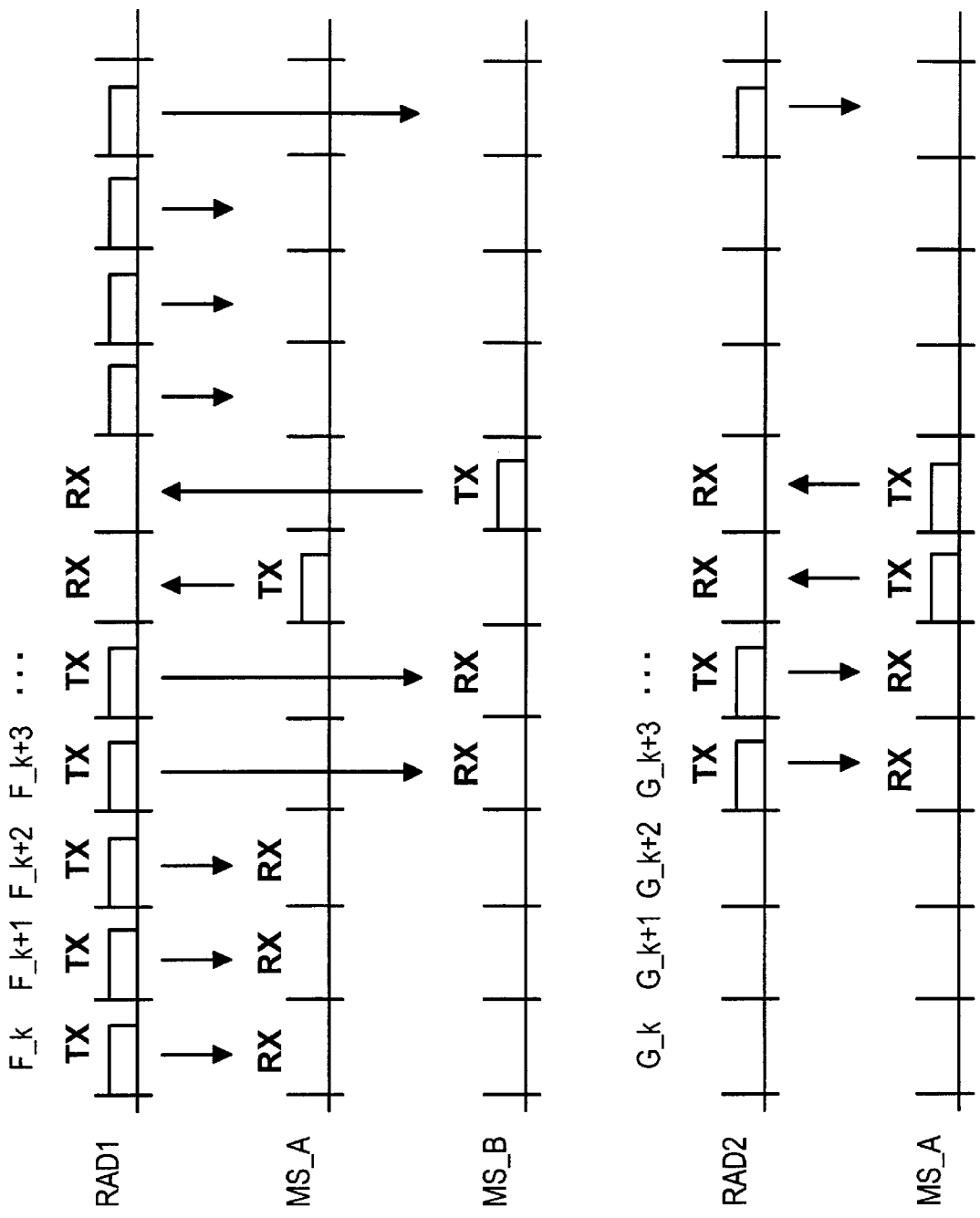

As another example of the operation of Applicant's invention, assume that the user MS_C desires a balanced link, i.e., a 1:1 bandwidth ratio. Starting with a slot configuration as depicted in FIG. 6A, MS_C can be accommodated as illustrated by FIG. 8A; starting with the slot configuration of FIG. 6B, MS_C can be accommodated as illustrated by FIG. 8B. In both FIGS. 8A, 8B, assigning MS_C to RAD2 and scheduling RAD2's transmission and reception to coincide with transmission and reception, respectively, of RAD1 results in three extra idle slots in the RAD2 structure, and only 4/7 of the maximal link throughput is used for user MS_C.

It will be appreciated from FIGS. 8A and 8B that the particular disposition of the extra slots is not critical provided transmission and reception of the radios coincide. Thus in FIG. 8A for example, the TX information sent in the slot corresponding to carrier frequency G_k+2 could have been sent in either of the extra slots corresponding to carrier frequencies G_k, G_k+1 and then the G_k+2 slot would have been one of the extra transmission slots.

Although the slot structures depicted in FIG. 8A and FIG. 8B lead to the same result in terms of throughput and bandwidth for users MS_A and MS_B, it is currently believed to be preferable to bundle or aggregate the transmit and receive slots as much as possible as is depicted in FIGS. 6B, 7B, 8B. Aggregating slots gives greater flexibility in the allocation of new users and their desired bandwidth ratios among the radios, especially when multi-slot packets are used as described in more detail below. The controller 506 in the multi-radio station 500 aggregates and allocates slots and users.

Figure 9B:
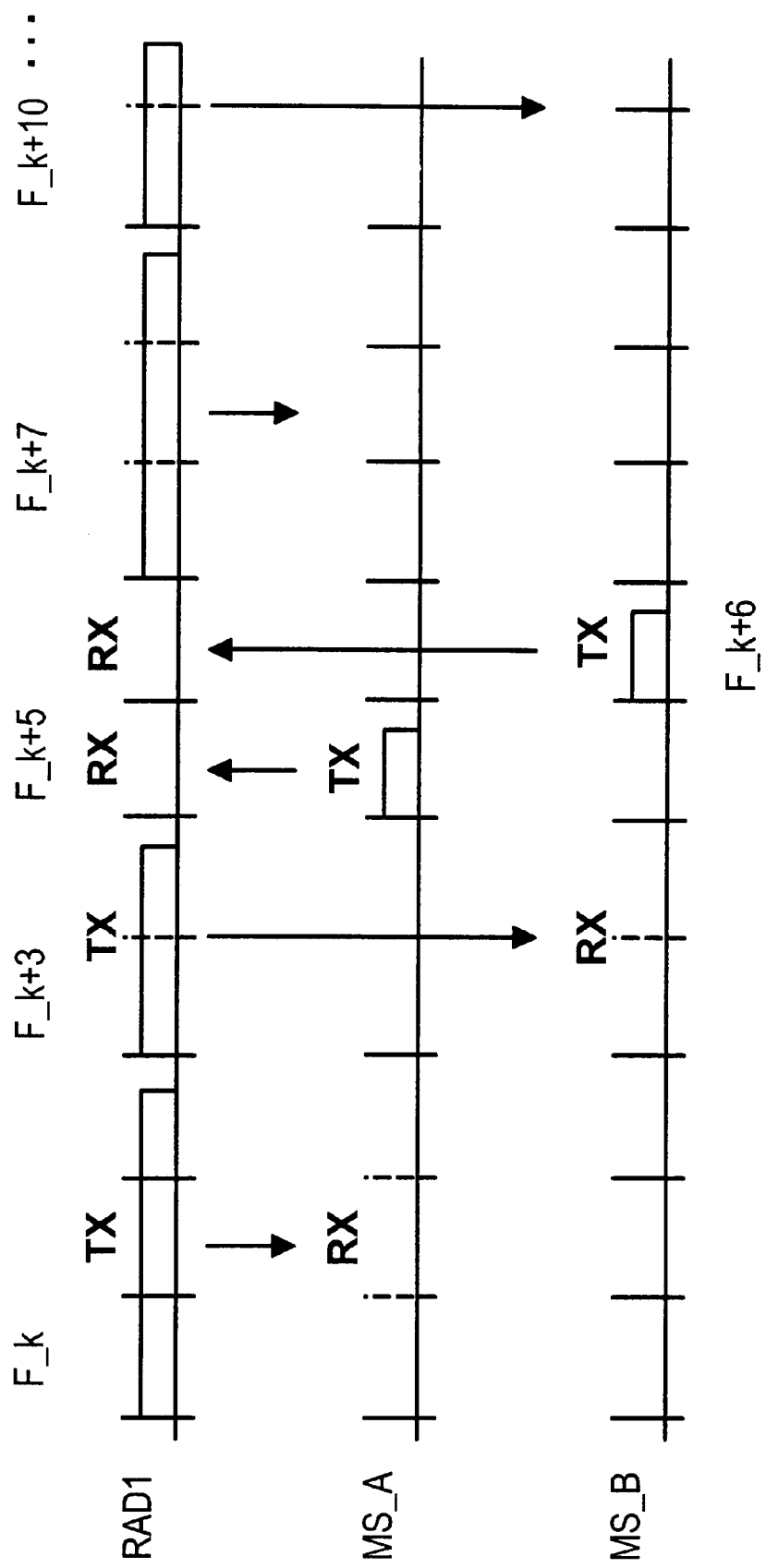

The preceding description is in terms of single-slot packets, which is to say that each packet could be transmitted within the duration of one time slot, with a possible allowance of some guard time. In order to increase the throughput of a connection, it is advantageous to use multi-slot packets, as is done in the BLUETOOTH system for example. Multi-slot packets yield higher throughput by reducing a connection's overhead, e.g., the ratio of packet header and guard time(s) to packet payload. This is depicted by FIGS. 9A, 9B, that correspond to FIGS. 6A, 6B respectively and that illustrate the use of multi-slot packets to obtain higher throughputs in the connections of radio RAD1 to a terminal MS_A and to a terminal MS_B. In FIGS. 9A, 9B, the radio RAD1 transmits three-slot packets to the terminal MS_A and two-slot packets to the terminal MS_B, with the terminals transmitting one-slot packets to the radio. This arrangement is consistent with the 3:1 and 2:1 down/uplink bandwidth ratios requested by the terminals as in FIGS. 6A, 6B.

It will be noted that FIGS. 9A, 9B indicate that each multi-slot packet is sent at one carrier frequency only, with that carrier frequency being determined from the sequence of hop frequencies based on the slot in which a multi-slot packet starts. For example, the first (left-most in FIG. 9A) TX slot to MS_A uses carrier frequency F_k and the next TX slot to MS_A uses carrier frequency F_k+4. Using the same carrier frequency for a multi-slot packet and determining that carrier frequency according to a single-slot frequency hopping sequence is advantageous because it simplifies the communication system in that the transmitter and receiver need not re-tune during a packet (which could require a preamble for re-synchronization) and in that the transmitter and receiver need not keep track of the last carrier frequency used. It will be appreciated, however, that other arrangements, like assigning carrier frequencies to packets according to a predetermined sequence indexed by the packets, irrespective of the slot-lengths of the packets, is also possible.

Comparing FIGS. 9A and 9B, it can be seen that the slot structure depicted in FIG. 9B, in which the TX and RX slots are respectively aggregated, is preferable since it enables the use of a multi-slot packet up to five slots in length, whereas the structure in FIG. 9A allows a multi-slot packet up to only three slots in length. The longer length maximizes the flexibility of the communication system in dynamically adjusting to the varying bandwidth demands of the remote terminals.

If there are a number of carrier frequencies available, there are numerous ways of aggregating and allocating slots to remote terminals. It will be appreciated that for a single base station, the task is to find a solution to a combinatorial packing problem, like the popular game Tetris. If there are N services (users) and K radios, then there are $K^N/K$, or $K^{N-1}$, possible combinations to consider, and one usually wants the combination yielding the best overall efficiency (i.e., fewest unused slots). Nevertheless, maximizing overall efficiency is not necessarily the only constraint, or boundary condition, on the packing problem; one may also require, for example, that one or more users have a predetermined bandwidth.

There are several ways to solve this kind of packing problem, which arises in many areas such as dynamic, or adaptive, channel allocation in cellular radio telephony. One way is simply to carry out an exhaustive search, testing all possible combinations. When the number of combinations is large, other ways like "simulated annealing" can become more attractive. "Simulated annealing" is a known technique that is widely applicable, e.g., to hard satisfiability problems as described in William M. Spears, "Simulated Annealing for Hard Satisfiability Problems" in "Cliques, Coloring, and Satisfiability: Second DIMACS Implementation Challenge", David S. Johnson and Michael A. Trick (eds.), DIMACS Series in Discrete Mathematics and Theoretical Computer Science, vol. 26, pp. 533–588 American Mathematical Society (1996). In accordance with Applicant's invention, the allocation methods base their allocations on criteria set by each of the users. In the following description, several allocation methods are described and evaluated.

For a first method, let the communication system use a link format that does not limit the allocation of slots by a framing structure. An example of such a communication system is the BLUETOOTH system, in which one of the transceivers participating in a communication session is a master unit that is completely free in allocating the slots for that session, independent of any other sessions among other units. In addition, let the system include a multi-radio base station having three radios and five remote users A, B, C, D, and E having down/uplink bandwidth ratios of 6:1, 5:1, 4:1, 3:1, and 2:1, respectively.

Figure 10A:
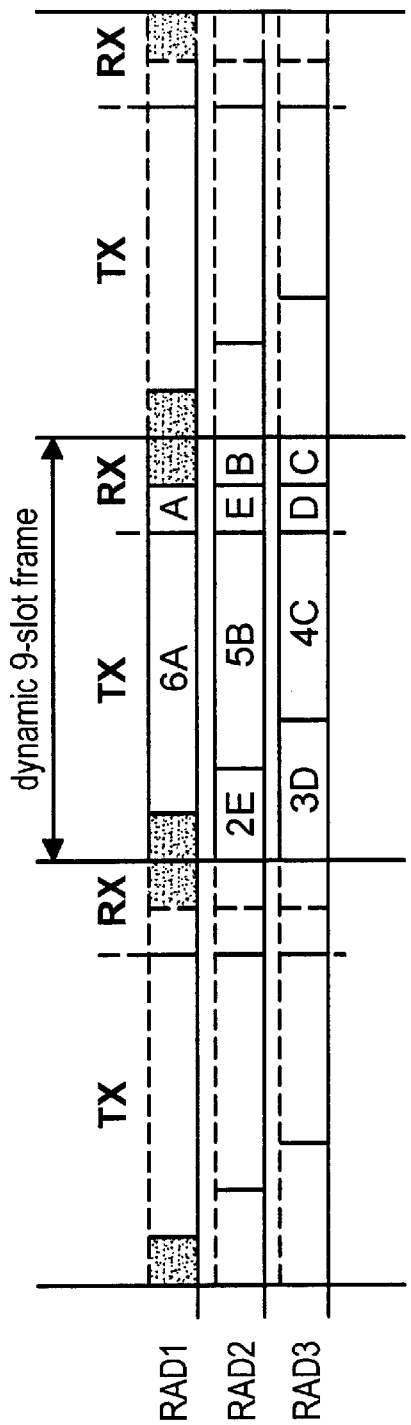
FIGS. 10A, 10B depict examples of slot allocation methods that optimize overall efficiency.
Figure 11A:
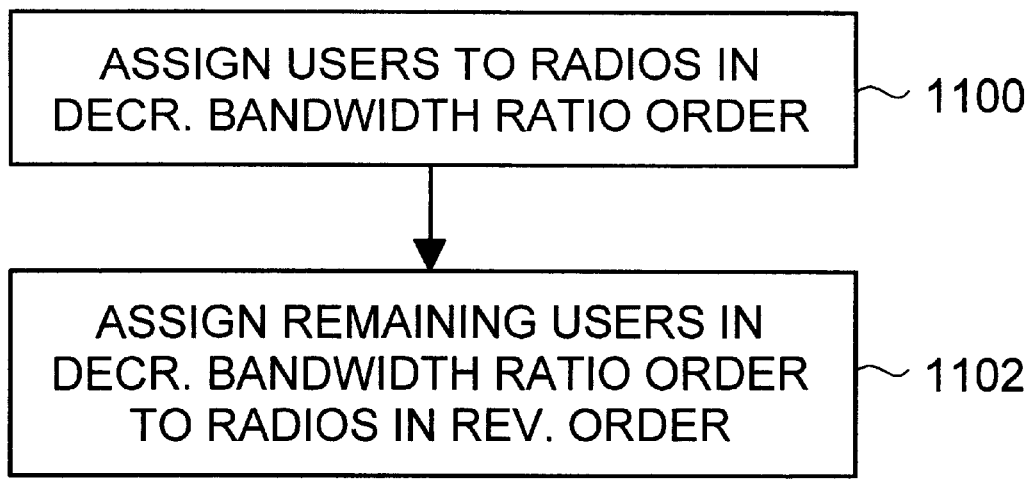
FIGS. 11A, 11B, 11C are flowcharts of slot allocation methods in accordance with Applicant's invention.

The first method has a goal of maximizing the efficiency, or overall throughput, of the system, which is obtained by using all of the radios in the base station as much of the time as possible, as illustrated for example by FIG. 10A. A flowchart of the first method is depicted in FIG. 11A. The first step 1100 of the first method is to assign the remote units one by one to the available base station radios in order of decreasing required bandwidth ratio. In this example, the first step 1100 results in unit A, which requires the largest bandwidth ratio (6:1), being assigned to a first one of the radios, e.g., radio RAD1, and in unit B, which requires the next-largest bandwidth ratio (5:1), being assigned to a second one of the radios, e.g., radio RAD2, and in unit C, which requires the next-largest remaining bandwidth ratio (4:1), being assigned to the last remaining available radio, e.g., radio RAD3. After the first step 1100 of the first method, the radios in the base station have each been assigned to a respective remote unit.

The next step 1102 of the first method is to assign the remaining remote terminals one by one in order of decreasing required bandwidth ratio to the base station radios taken in the reverse of the order in which they were taken for step 1100. In this example, step 1102 results in unit D, which requires the next-largest remaining bandwidth ratio (3:1), being assigned to radio RAD3, and in unit E, which requires the last remaining bandwidth ratio (2:1), being assigned to radio RAD2.

In general, solving the packing problem with a goal of maximizing the overall throughput leads to the remote terminals being assigned in order of decreasing bandwidth ratio to the radios taken in a sort of zig-zag order, i.e., RAD1, RAD2, . . . , RADN-1, RADN, RADN, RADN-1, . . . , RAD2, RAD1, RAD1, RAD2, . . . Thus, if in the example there were units F, G, and H, each having bandwidth ratios of 1:1, unit F would be assigned to radio RAD1, unit G would be assigned to radio RAD1, and unit H would be assigned to radio RAD2. (It can be noted that terminals having equal service requirements can be interchanged.)

Referring to FIG. 10A, each multi-slot TX (downlink) packet in this example has a corresponding RX (uplink) packet, and the figure shows these packets as grouped in time into frames. For example, radio RAD2 transmits TX packets 2E, 5B to remote units E, B, respectively (the numbers 2 and 5 indicating the slot lengths of the TX packets), and then receives 1-slot-length RX packets E, B from those units. As indicated by FIG. 10A, the first method's packing of the remote units A–E on the radios RAD1–RAD3 yields an effective frame length of nine slots, which is just the sum of seven TX slots and two RX slots, and an overall bandwidth ratio of 7:2. Two slots on radio RAD1, indicated by the shading, are not used. Such effective frames are repeated in succession as long as the bandwidth requirements of the users remain the same, and the efficiency of this allocation is $(3\times9-2)/(3\times9)=25/27$. (If all of the slots were used, the efficiency would be 27/27 or 1, and the overall throughput would be maximal.) These effective frames are "dynamic" in the sense that they change according to changes in the bandwidth requirements of the users that trigger reapplication of the allocation method.

Rather than maximizing overall throughput, suppose the system should maximize throughput for a particular remote unit. In this second example, let the numbers of radios and remote units be as in the example described above and let the bandwidth ratios required by the remote units be as in that example, but let unit E having a bandwidth ratio of 2:1 require maximal throughput. An optimal allocation of remote units and slots is depicted in FIG. 10B, and this allocation is produced by a second allocation method that is illustrated by the flowchart of FIG. 11B.

The first step 1110 of the second method is to assign a remote unit that requires maximal throughput to one of the radios, with the assigned radio being used exclusively for that remote unit. In this example, let radio RAD1 be assigned and used exclusively for the unit E. The next steps of the second method are the same as the steps of the first method for the remaining radios and remote units. The second step 1112 of the second method is to assign the remaining remote units one by one to the remaining available base station radios in order of decreasing required bandwidth ratio, and if needed the third step 1114 of the second method is to assign the remaining remote terminals one by one in order of decreasing required bandwidth ratio to the base station radios taken in the reverse of the order in which they were taken for step 1112.

Figure 10B:
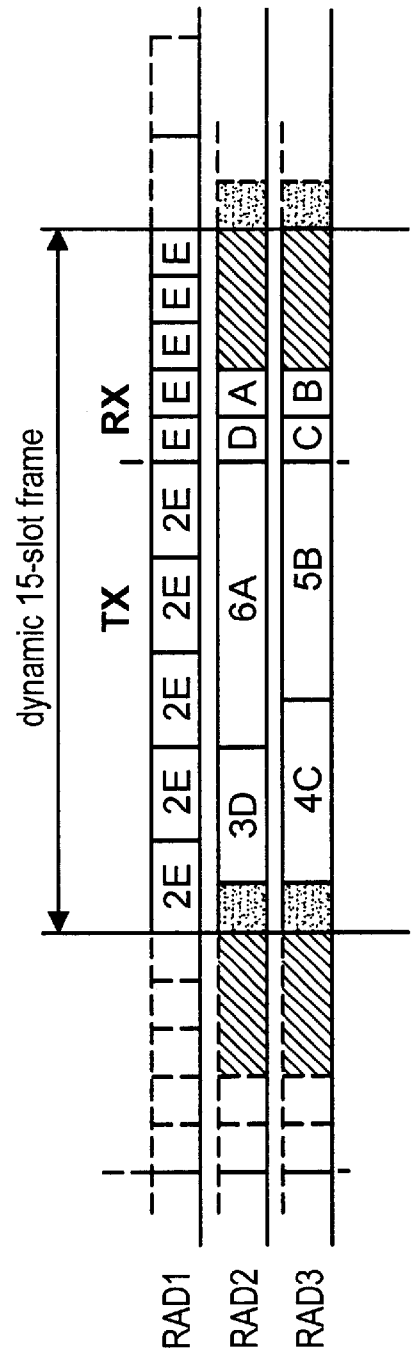
Figure 11B:
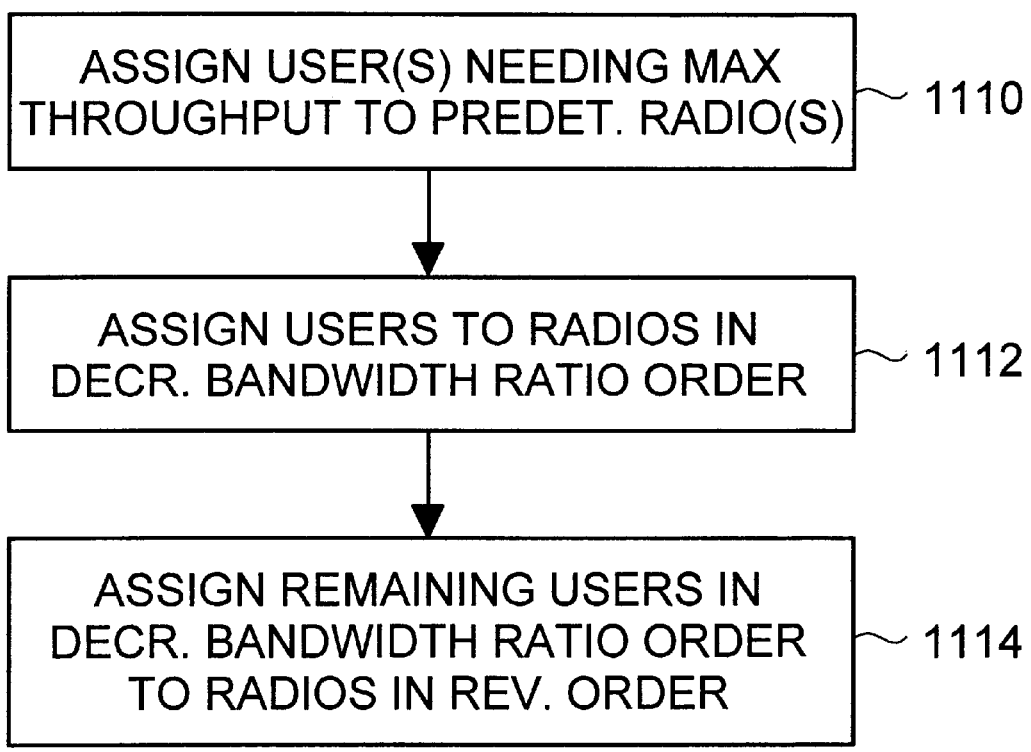

An allocation produced by the second method is depicted in FIG. 10B, which shows remote unit E on radio RAD1, units A, D on radio RAD2, and units B, C on radio RAD3. It will be understood that the depicted allocation resulted by choosing radio RAD2 first in step 1112. The overall frame length of this allocation is 10TX+5RX=15 slots, with an overall bandwidth ratio of 10:5. It will be noted that each of radios RAD2, RAD3 has four unused slots, so the overall efficiency has decreased to (3×15−8)/(3×15)=37/45, but the individual throughput of user E has increased from 3/9 in FIG. 10A to 1 (maximum) in FIG. 10B.

Figure 10C:
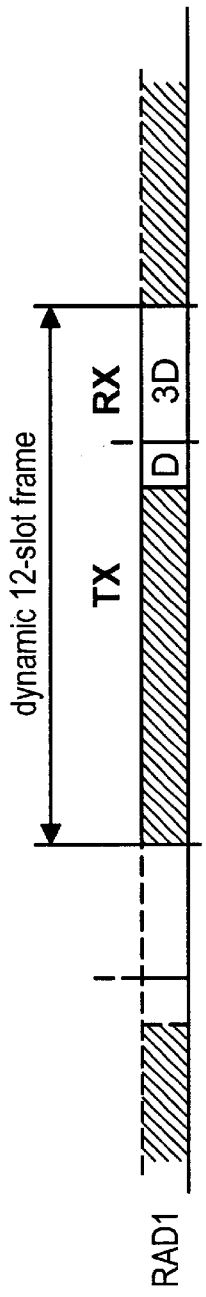
FIGS. 10C, 10D depict examples of slot allocation methods that support opposite bandwidth ratios.
Figure 11C:
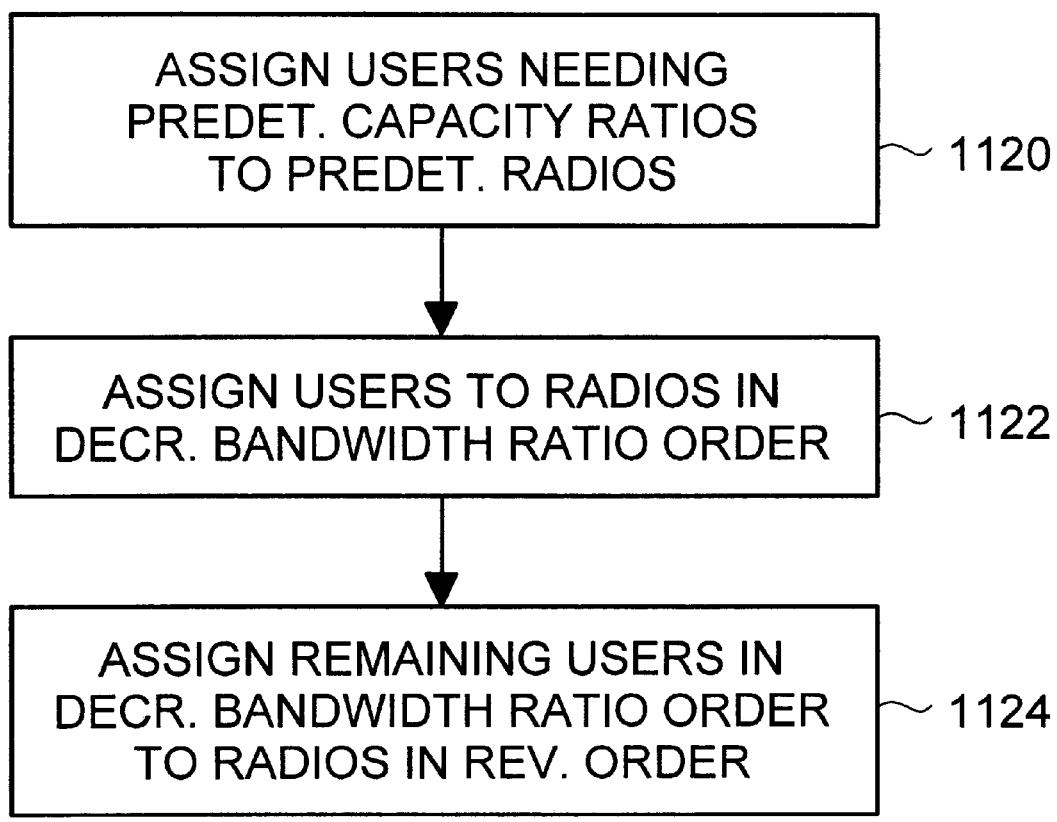
Figure 14:
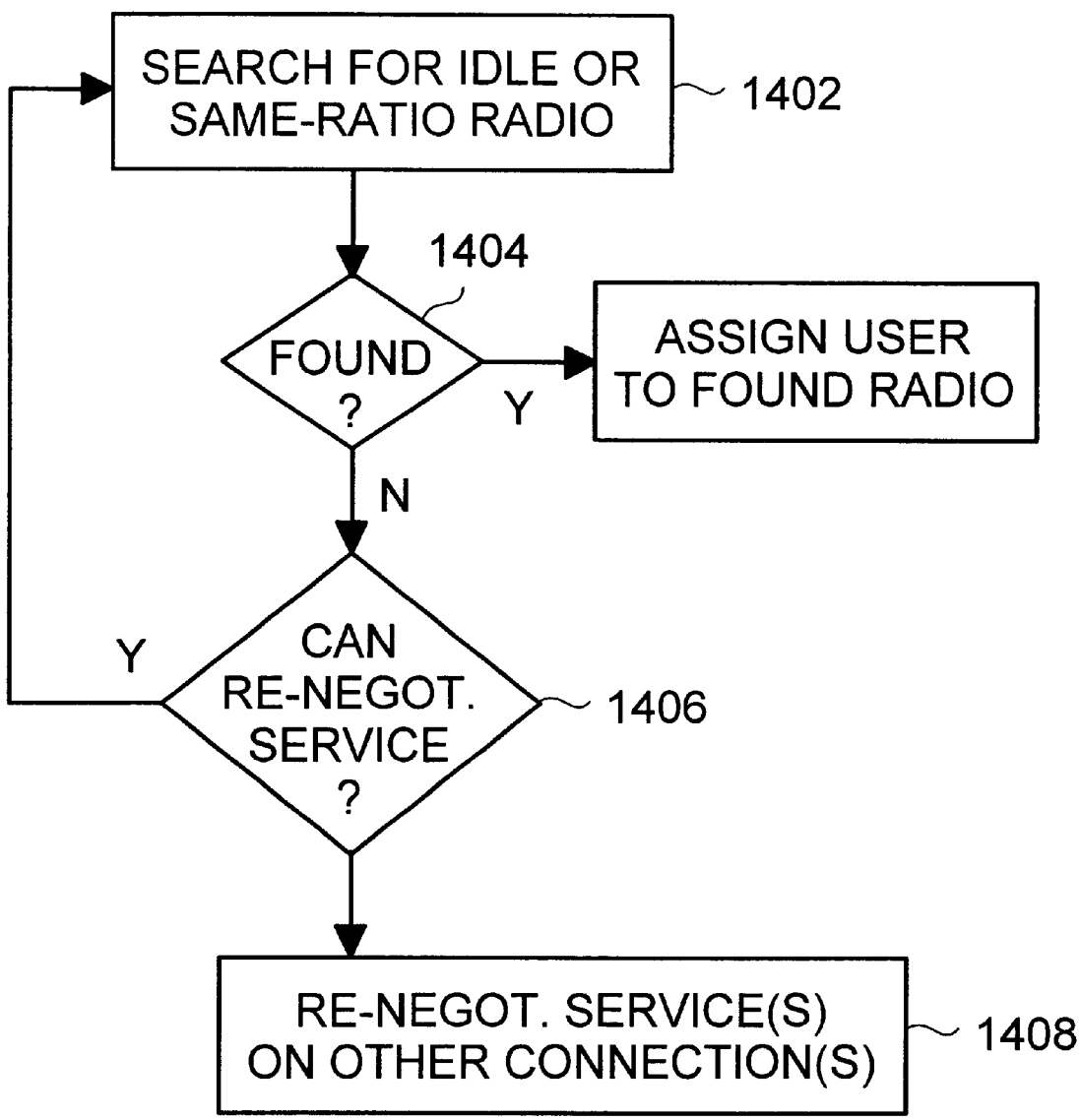
FIG. 14 is a flowchart of a method of macroscopic resource allocation according to Applicant's invention.

Since the remote units can change their required bandwidth ratios dynamically, consider now a third example, in which remote unit D that had a 3:1 bandwidth ratio in the preceding examples changes its required bandwidth ratio to 1:3 and at least remote unit D is in range of at least two base stations. This can be handled by a third allocation method in which remote units having opposite bandwidth ratios (e.g., N:1 and 1:N) are assigned to separate radios in separate base stations. An allocation produced by the third method is depicted in FIG. 10C and a flowchart of the third method is depicted in FIG. 11C. This is an aspect of "macroscopic resource allocation" that is described in more detail below in connection with FIGS. 13, 14.

In this third example, let the numbers of radios and remote units be as in the first example and let the bandwidth ratios required by the remote units be as in that example except that radio RAD1 is in one base station, radios RAD2, RAD3 are in another base station, and remote unit D requires a 1:3 bandwidth ratio. The first step 1120 of this third method, illustrated by the flowchart in FIG. 11C, is to identify any remote unit(s) having bandwidth ratio(s) 1:x and assign them to a base station and radio(s) intended to handle such units. Suppose the base station radio RAD1 is assigned to remote units having bandwidth ratios 1:x; thus, the remote unit D is assigned to RAD1 rather than to one of radios RAD2, RAD3. The next steps 1122, 1124 of the third method allocate the remaining remote units (having bandwidth ratios x:1) to the base station radios selected for such ratios according to the first method (or even the second method) described above. The result of using the first method is shown in FIG. 10C, and this allocation has an overall frame length of twelve slots and an overall efficiency, due to the eight unused (TX) slots on radio RAD1, two unused slots on radio RAD2, and one unused slot on radio RAD3, of (3×12−11)/(3×12)=25/36.

It will be appreciated that if more remote units had required bandwidth ratios of 1:x, they would be assigned to radio RAD1 or to additional radios reserved for such remote units and those units could be allocated among the reserved radios according to either the first or the second methods described above. In fact, the third example can be viewed as a situation in which two radios are reserved for remote units having bandwidth ratios of x:1 and those remote units are allocated among the reserved radios.

Figure 10D:
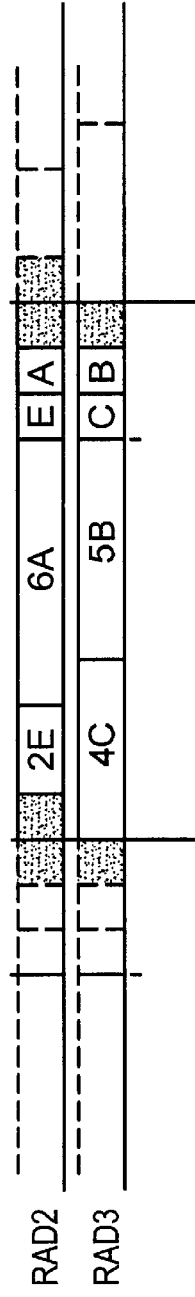

A different allocation targeting on a single base station is depicted in FIG. 10D, which shows remote unit B with a bandwidth ratio of 5:1 and remote unit D with a bandwidth ratio of 1:3 on the same radio RAD1. The overall frame length of this allocation is ten slots, rather than twelve slots as in FIG. 10C, the overall efficiency is 25/30, and the overall bandwidth ratio of the base station is 6:4.

In general, if there are no restrictions in the allocations of the slots (i.e., no frame restrictions) and no special throughput requirements by individual remote units, the overall efficiency is optimized by allocating the remote units such that the overall frame length (i.e., the total number of TX and RX slots on a radio) is minimized. (Compare FIGS. 10C, 10D.) This also results automatically in the use of all available radios as in FIGS. 10A, 10B.

It can be noted it is possible to optimize overall efficiency by extending some user's TX and RX periods while maintaining that user's bandwidth ratio if it is not necessary to minimize the frame length. To illustrate this, assume a system of two radios and two remote users that have bandwidth ratios of 5:1 and 3:1. If the users were simply assigned to different radios, the overall efficiency would be 10/12 for a frame length of six slots (determined by the 5:1-ratio user). Looking at successive pairs of frames of the 3:1 user permits considering that user as having a 6:2 bandwidth ratio. Assigning the 5:1-ratio user and the 6:2-ratio "user" to different radios yields an overall efficiency of 14/16 for a frame length of eight slots (determined by the 6:2-ratio "user"). The overall efficiency has increased, and the user enjoying maximal throughput has changed.

Relaxing the minimal-frame-length boundary condition increases the magnitude of the packing problem since the number of possible combinations increases. To control such increase, other boundary conditions might be imposed, such as a threshold on the delay introduced by increasing the frame length or the statistics of the instantaneous packet traffic (message lengths and pauses). It will be appreciated that this kind of combinatorial packing problem is well known as noted above and that the particular solutions presented in this application should be taken as exemplary rather than restrictive.

Rather than having an overall frame length that is dynamically variable as in the examples described above, suppose the communication system has a fixed frame length, which is the case in most conventional cellular radio systems. For example in the DECT system, each frame comprises twenty-four slots and each of the twenty-four slots can be chosen arbitrarily as either a TX or RX slot. In such a system having fixed-length frames, there are two optional methods of allocating remote units to base station radios.

In the first method, as many units as possible are allocated to as few radios as possible. The first method has the advantage of leaving available as many radios as possible, but the overall bandwidth ratio of the system becomes substantially fixed. FIG. 12A is an example of a slot allocation produced by applying the first method in a communication system comprising a base station having three radios and five remote terminals A–E having bandwidth ratios as in the examples described above and having a fixed frame length of fourteen slots. In the allocation of FIG. 12A, each 14-slot frame has eleven TX slots and three RX slots, and all five users A–E can be allocated to just two radios. Using this method, the remaining radio(s) (RAD3 in the example) are available for allocation to additional users, provided the now fixed 11:3 overall bandwidth ratio is followed.

A packing method that leaves available as many radios as possible and leads to the allocation shown in FIG. 12A can begin by first noting the total number of TX and RX slots required, dividing by the frame length in slots, and rounding up, thereby determining the minimum number of radios that are needed. In this example, a total of twenty-five slots (twenty TX and five RX) must be distributed into 14-slot frames, so at least two radios are needed to provide those slots. Next, the users are assigned to the radios in order of decreasing required bandwidth ratio. Thus, the user requiring the largest ratio is assigned to one of the radios (user A is assigned to RAD1 in FIG. 12A), and then the next-largest-ratio user is considered for that radio. In this example, unit B cannot be assigned to radio RAD1 within the 14-slot-frame criterion, so unit B is assigned to radio RAD2 and unit C is considered for radio RAD1. Continuing this process leads to the allocation depicted in FIG. 12A.

The second allocation method for fixed-frame-length systems does not fix the overall bandwidth ratio as in the first method but uses all of the available base station radios. FIG. 12B is an example of a slot allocation produced by applying the second method in a communication system as in the previous example. It can be seen that all radios RAD1, RAD2, RAD3 are used and that the overall bandwidth ratio is not fixed to 11:3 but varies between 7:7 and 12:2 depending on where the first TX slot is positioned as indicated by the arrows showing how the dashed line separating TX slots from RX slots can move. Thus, if a fourth radio RAD4 were provided in the base station, that radio would have greater flexibility in selecting remote unit(s) based on their bandwidth ratio(s).

The preceding description is in terms of a base station and several remote users, each having a respective bandwidth ratio requirement. It will be understood that Applicant's invention is not limited to such a communication system but is equally useful for a communication system that provides peer-to-peer connections carrying services that each have a respective bandwidth ratio requirement. In such a communication system, there may be one remote user instead of (or in addition to) several users, and that user requires several services supported by different channels on the connection.

In the preceding description, several methods of slot allocation and user assignment (traffic scheduling and packing) have been described in a context of a communication systems having a single base station. This may be called "microscopic resource allocation". The following description considers slot allocation and user assignment in a communication system having more than one base station. This may be called "macroscopic resource allocation." Of course, it will be appreciated that optimal performance for a real-world communication system will be obtained when Applicant's microscopic and macroscopic resource allocation procedures are integrated.

Macroscopic resource allocation is particularly useful in communication systems that cover "hot spots", i.e., areas where high bandwidth is desired, with many base stations such that a remote terminal could simultaneously receive signals from a plurality of base stations. Such a communication system is depicted in FIG. 13, which shows a remote terminal MS_A disposed in a "hot spot" covered by the intersection of cells, or coverage areas, 1302-1, 1302-2, 1302-3, 1302-4 corresponding to respective base stations BS1, BS2, BS3, BS4. In practice, the remote terminal locks to the base station signal that is received with the highest signal strength, which is indicated in FIG. 13 as BS1. This usually corresponds to the base station having the smallest path loss for the remote terminal and that thus likely provides a connection having the highest signal-to-noise ratio.

Nevertheless in systems using adaptive channel allocation (see, e.g., U.S. Pat. No. 5,491,837 cited and incorporated above) or in systems using uncoordinated frequency hopping (see, e.g., the BLUETOOTH system cited above), locking to the strongest base station is not necessarily optimal. Indeed, it is often not the base station received strongest but the base station that can provide the highest TDD bandwidth that a remote terminal desires to connect to. (This of course depends on the service(s) required by the remote terminal.) Applicant's macroscopic resource allocation procedure is described below.

Most of the time, a remote terminal can be expected to be in an idle mode (also called park or standby mode) in which the terminal's power consumption is low and the terminal is locked to a control channel or a beacon channel of its strongest received base station. In idle mode, the terminal "sleeps" most of the time, but "wakes up" at regular intervals to listen to the control or beacon channel to re-synchronize itself to the base station and to determine whether it has any page messages waiting. If a connection is desired (either initiated by the base station or initiated by the remote terminal), an initial connection is made between the remote terminal and the base station to which the terminal is locked, and initial messages are exchanged over this connection for, among other things, negotiating the type of service required. In particular, the downlink/uplink bandwidth ratio is negotiated. This information is advantageously sent by the base station to a base station controller (BSC) that has knowledge of all connections supported by base stations in the neighborhood of the remote terminal. Such a system is described in Applicant's U.S. Pat. No. 6,473,412, entitled, "Uncoordinated Frequency Hopping Cellular System", which is incorporated here by reference. FIG. 13 shows a BSC connected to base stations BS1, BS2, BS3, BS4.

For reasons explained above, a base station having a plurality of radios (see, e.g., FIG. 5) is not completely free in allocating its downlink and uplink bandwidths to a requested connection. In accordance with a first step 1402 of Applicant's macroscopic resource allocation method that is illustrated by the flowchart in FIG. 14, the BSC searches for a base station that either is completely idle or has connections already in progress that require the same down/uplink bandwidth ratio as the requested connection. FIG. 13 depicts the requested connection as having a 4:1 bandwidth ratio and base stations BS1, BS2, BS3, and BS4 as supporting bandwidth ratios of 5:1, 3:1, 1:3, and 8:1, respectively. In particular, the BSC searches for a base station that can support the service requested without violating the TDD requirement based on information provided to the BSC through signaling connections to each base station. If the "new" terminal MS_A had required a link having a bandwidth ratio of 5:1, then the base station BS1 would have been the obvious choice to support that link since it already supports services having a bandwidth ratio of 5:1.

If such a matching base station cannot be found (step 1404), either the requested service is re-negotiated (step 1406) or one or more of the existing connections on one of the base stations is re-negotiated (step 1408) to allow the "new" terminal to be supported. For example, if the "new" terminal MS_A requires a link having a 4:1 bandwidth ratio, there is no base station in range that supports that particular bandwidth ratio. Thus, the terminal MS_A can connect to either base station BS1 or to base station BS4 and accept a reduction in its maximal throughput to either 5/6 or 5/9, respectively, as a result of step 1406. Alternatively, the terminal MS_A can connect to either base station BS2 or to base station BS3, if the services already provided by these base stations allow reductions in throughput, as a result of step 1408. (The existing connection on base station BS2 would have to reduce its throughput to 4/5 or the existing connection on base station BS3 would have to reduce its throughput to 4/7; the new connection to terminal MS_A would not get more throughput than 5/7.) If the terminal can accept a degradation in throughput (step 1406), the terminal can decide itself to continue its connection on base station BS1 or base station BS4 if a radio is available in the base station, but BSC intervention is needed to continue the connection on base station BS2 or base station BS3 since existing links on those stations are affected.

Applicant's invention is described above with reference to particular embodiments, and it will be readily apparent to those skilled in the art that it is possible to embody the invention in forms other than those described above. The particular embodiments described above are merely illustrative and should not be considered restrictive in any way. The scope of the invention is determined by the following claims, and all variations and equivalents that fall within the range of the claims are intended to be embraced therein.

What is claimed is:

1. In a communication system that implements communication links between a multi radio base station and a plurality of remote terminals, wherein each remote terminal requests a particular bandwidth ratio, a method of allocating slots in the communication links comprising the steps of (a) sequentially assigning, in descending order based upon the respective remote terminal's required bandwidth ratio, remote terminals to an available base station radio; and (b) after the available base station radios have been assigned a first remote terminal, assigning the remaining remote terminals, in descending order based upon the respective remote terminal's required bandwidth ratio, to the base station radios in the reverse sequence implemented in step (a).

2. A method according to claim 1, wherein:

at least one remote terminal requests the maximum throughput; and each remote terminal requesting maximum throughput is assigned to an available base station radio, and that radio is removed from the pool of available base station radios.

3. A method according to claim 1, wherein:

a remote terminal requesting a particular predetermined bandwidth ratio is assigned to a predetermined base station radio, and that radio is removed from the pool of available base station radios.

4. In a communication system that implements communication links between a multi radio base station and a plurality of remote terminals, wherein each remote terminal requests a particular bandwidth ratio, a method of allocating slots in the communication links comprising the steps of:

(a) determining the minimum number of base station radios required to support the remote terminals' transmission requirements;

(b) sequentially assigning, in descending order based upon the respective remote terminal's required bandwidth ratio, remote terminals to an available base station radio selected from the minimum number of base station radios calculated in step (a); and (c) after the available base station radios have been assigned a first remote terminal, assigning the remaining remote terminals, in descending order based upon the respective remote terminal's required bandwidth ratio, to the base station radios in the reverse sequence implemented in step (b).

* * * * *